United States Patent [19]

Ōsawa et al.

[11] Patent Number: 4,846,291

[45] Date of Patent: Jul. 11, 1989

[54] COMBINATION WEIGHING APPARATUS

[75] Inventors: Masao Ōsawa, Isehara; Fumihiro Tsukasa; Sadayoshi Tomiyama, both of Kanagawa; Noboru Tanaka, Atsugi, all of Japan

[73] Assignee: Anritsu Corporation, Tokyo, Japan

[21] Appl. No.: 93,549

[22] PCT Filed: Dec. 27, 1986

[86] PCT No.: PCT/JP86/00667

§ 371 Date: Aug. 25, 1987

§ 102(e) Date: Aug. 25, 1987

[87] PCT Pub. No.: WO87/04239

PCT Pub. Date: Jul. 16, 1987

[30] Foreign Application Priority Data

Dec. 29, 1985 [JP] Japan .................. 60-298544
Dec. 29, 1985 [JP] Japan .................. 60-298545
Mar. 22, 1986 [JP] Japan .................... 61-64539
Jul. 24, 1986 [JP] Japan ................... 61-174650
Jul. 24, 1986 [JP] Japan ................... 61-174651

[51] Int. Cl.$^4$ ............... G01G 13/00; G01G 19/52
[52] U.S. Cl. ................................ 177/25.18; 177/50
[58] Field of Search ............... 177/25.18, 164, 50

[56] References Cited

U.S. PATENT DOCUMENTS

| | | | |
|---|---|---|---|
| 4,344,492 | 8/1982 | Hirano | 177/25.18 |
| 4,385,671 | 5/1983 | Hirano | 177/25.18 |
| 4,465,149 | 8/1984 | Kawashima et al. | 177/25.18 X |
| 4,616,722 | 10/1986 | Moran | 177/25.18 X |
| 4,625,817 | 12/1986 | Kawashima et al. | 177/25.18 X |
| 4,658,920 | 4/1987 | Matsumoto et al. | 177/25.18 |
| 4,661,917 | 4/1987 | Haze et al. | 177/25.18 X |
| 4,666,002 | 5/1987 | Haze | 177/25.18 X |

FOREIGN PATENT DOCUMENTS

| | | |
|---|---|---|
| 56-100318 | 8/1981 | Japan . |
| 56-168512 | 12/1981 | Japan . |
| 57-53627 | 3/1982 | Japan . |
| 57-80523 | 5/1982 | Japan . |
| 2102582 | 2/1983 | United Kingdom . |

Primary Examiner—George H. Miller
Attorney, Agent, or Firm—Frishauf, Holtz, Goodman & Woodward

[57] ABSTRACT

A weighing apparatus comprises feeder means for temporarily storing an object to be weighed and discharging the object to be weighed as needed, a plurality of weighing hopper means each having a plurality of storage chambers which are integrally coupled, a plurality of weighing means, provided in correspondence with the plurality of weighing hopper means, for independently weighing weights (referred to as partial weights hereinafter) of objects to be weighed, stored in the storage chambers, and a control apparatus for calculating partial weight values of the objects to be weighed based on weighing signals from the weighing means. The control apparatus combines at least one of the calculated partial weight values and the number of objects to be weighed, calculated from the partial weight values, so as to select a combination closest or equal to at least one of a preset weight or a preset number, causes the selected objects to be weighed to be discharged and collected from the storage chambers, and includes at least a plurality of operation means for calculating at least one of true partial weights and the number of plurality of stored objects to be weighed. The control apparatus is controlled such that the discharge operation of the object to be weighed has a higher priority than that of the weighing operation of the object.

15 Claims, 22 Drawing Sheets

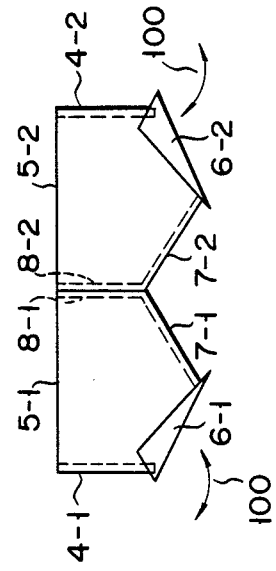
F I G. 3
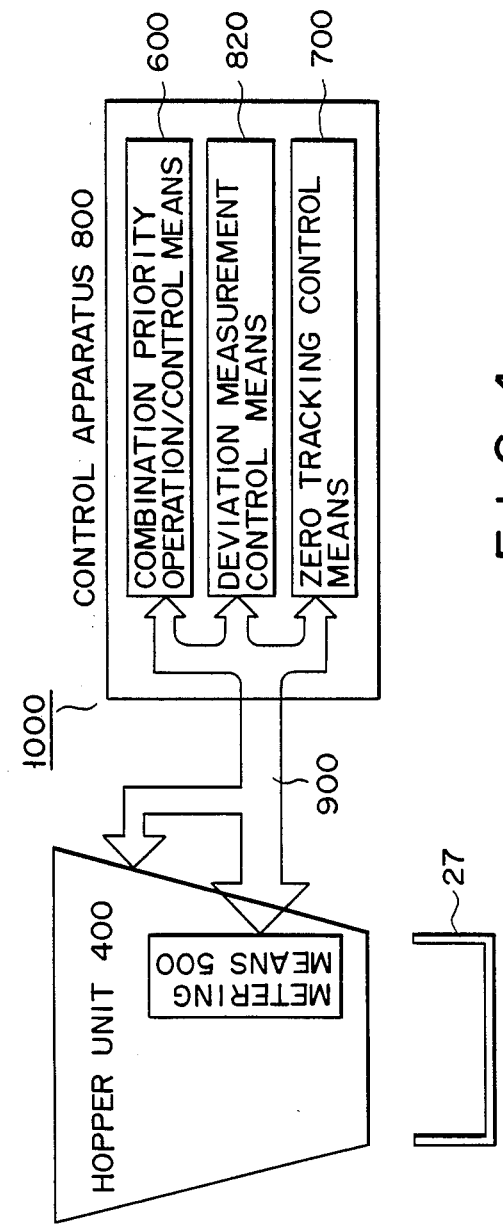
F I G. 4

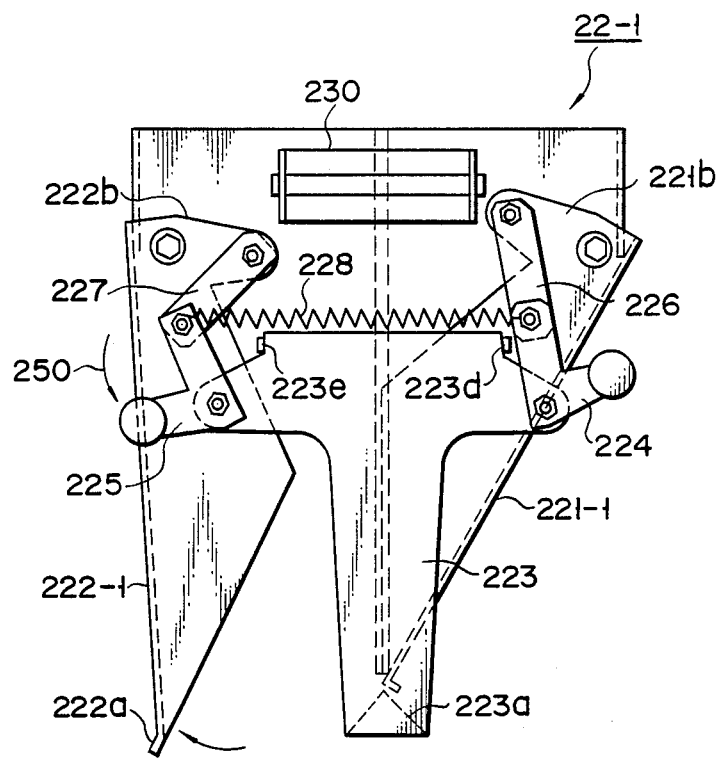
F I G. 9B

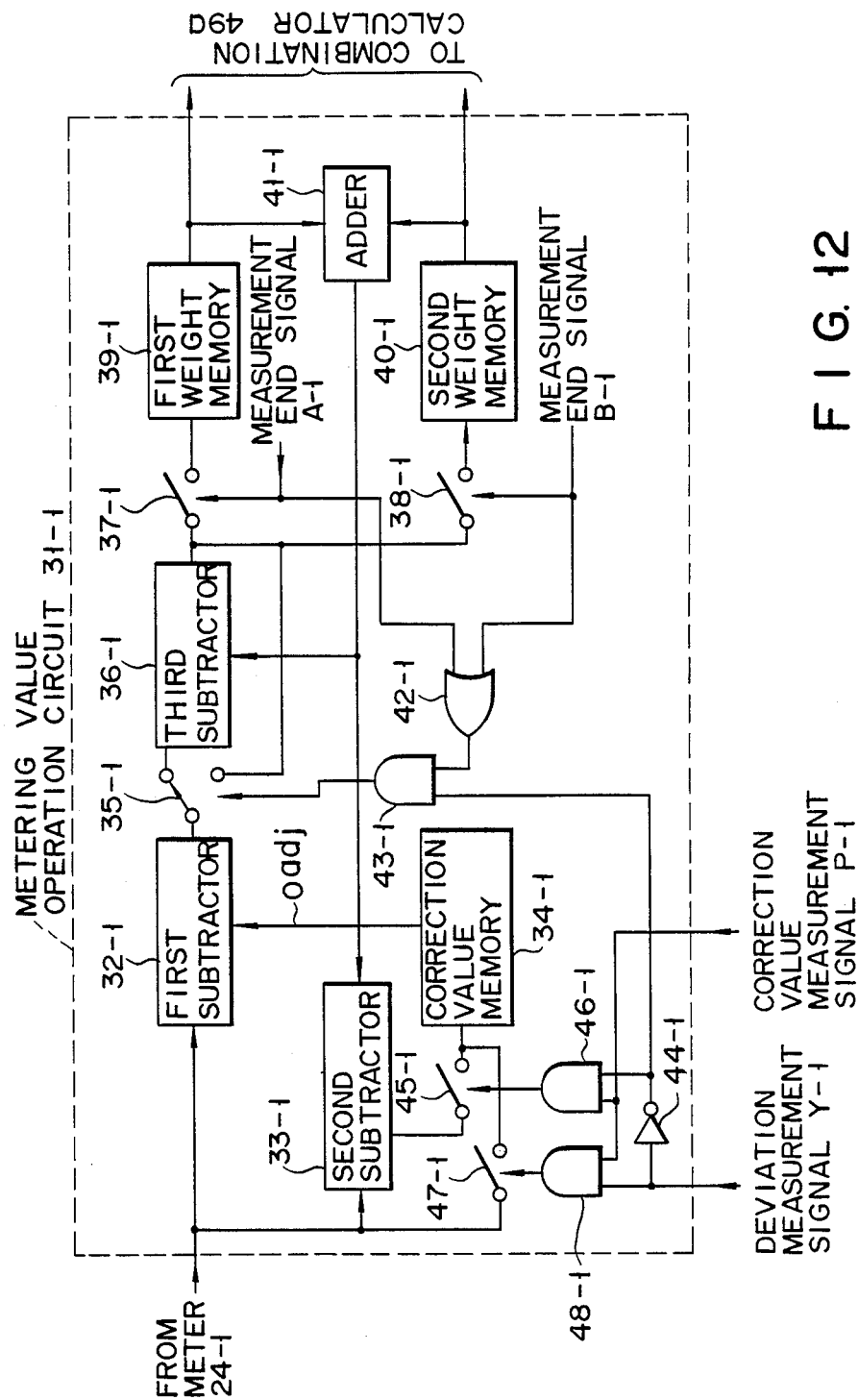
F I G. 12

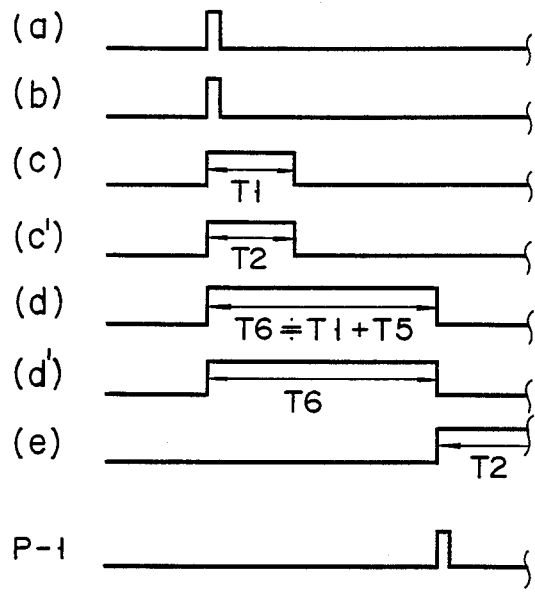
F I G. 16A
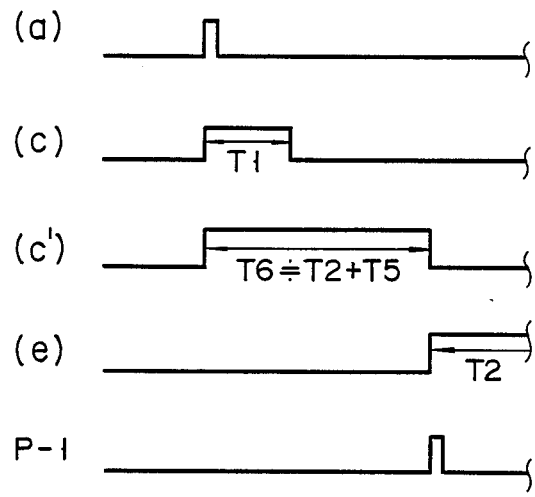
F I G. 16B

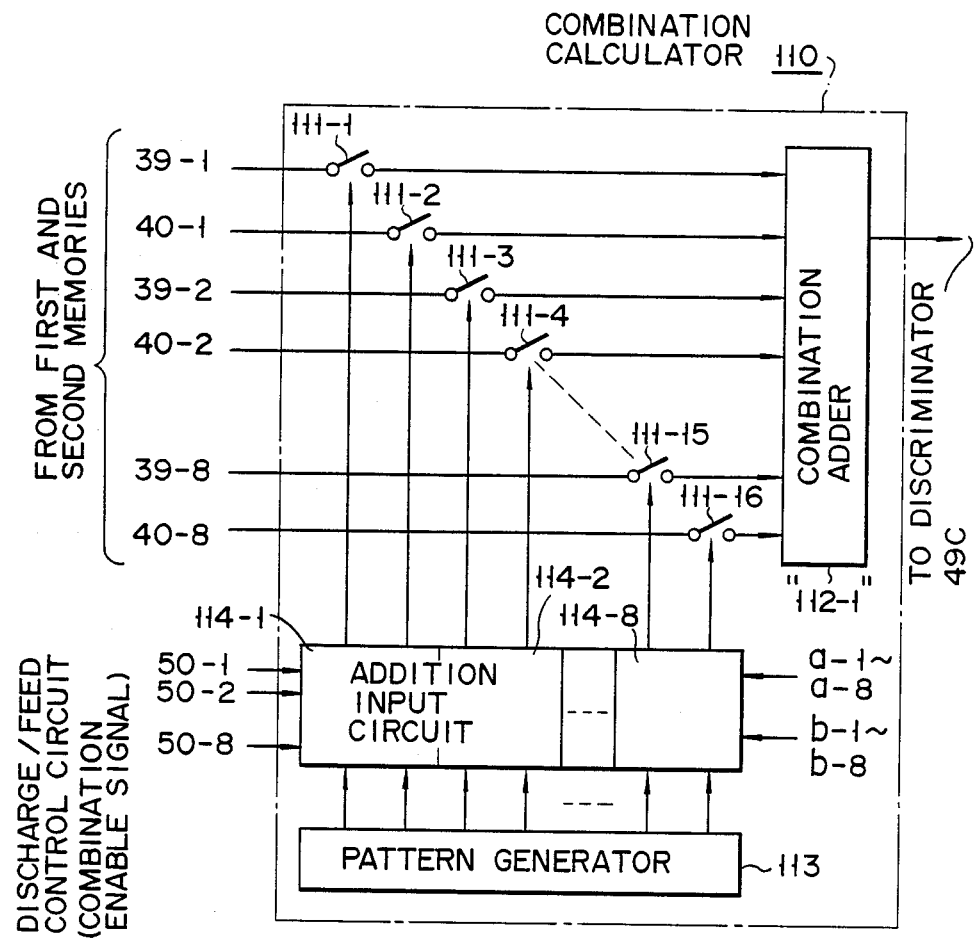
F I G. 18

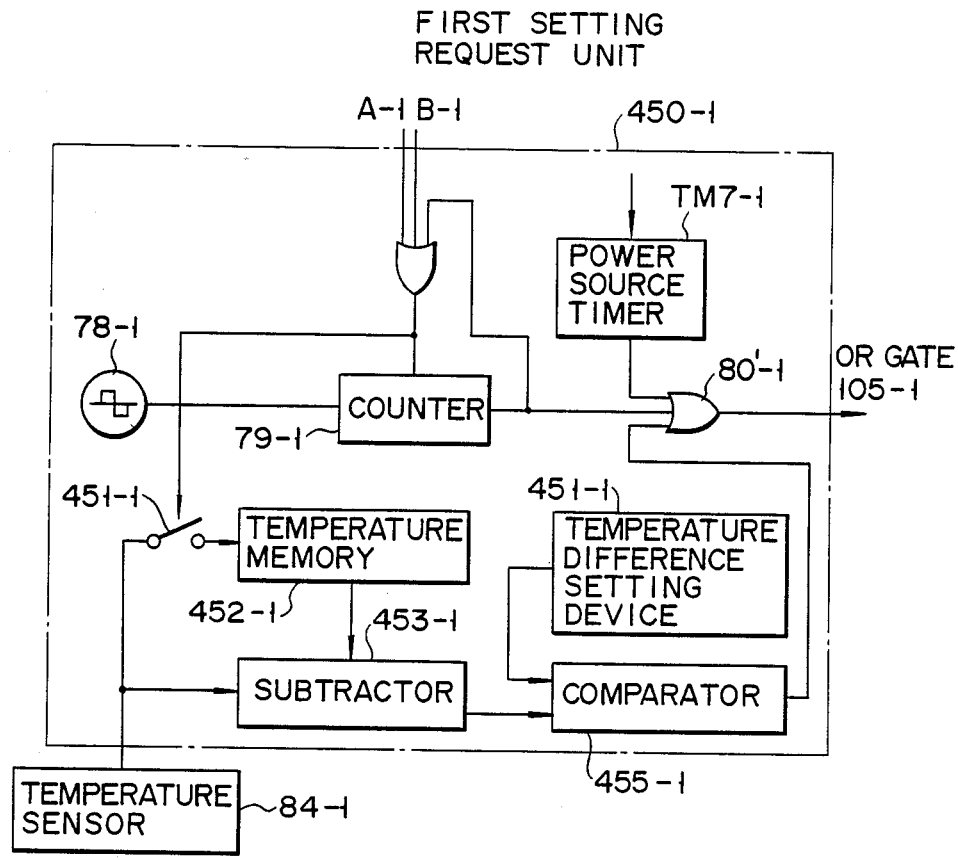
F I G. 23

COMBINATION WEIGHING APPARATUS

[TECHNICAL FIELD]

The present invention relates to a combination weighing apparatus which divides an aggregate (object to be weighed) of a large number of products whose weights individually vary, such as foodstuffs, into a plurality of product groups each having a partial weight as a part of a desired final target weight or a weight closest thereto, and combines the partial weights of these product groups to obtain a product set having the desired final target weight or a weight close thereto.

[PRIOR ART]

A combination weighing apparatus of this type is known. For example, U.S. Pat. Nos. 4,344,492 and 4,385,671 and British Patent No. 77067B have been proposed.

When, in a combination weighing apparatus of this type, a plurality of product groups each having a partial weight are appropriately combined to obtain a product set having a final target weight, as the number of groups to be combined becomes larger, the combined total weight can coincide with or be closely closest to a desired final target weight. More specifically, the combined total weight can coincide with or be close to the final target weight with high precision.

FIGS. 1 to 3 show a conventional combination weighing apparatus. The basic operation of the apparatus will be described, and various problems of the conventional weighing apparatus of this type will be explained.

First, the operation will be described with reference to FIG. 1, which shows the entire schematic structure.

In the combination weighing apparatus shown in FIG. 1, objects to be weighed, such as foodstuffs, fed from a plurality of feeders 1-1 to 1-$n$ to intermediate hoppers 2-1 to 2-$n$, are stored in pairs of weighing hoppers 4-1 to 4-2$n$ arranged therebelow when discharge gates 3-1 to 3-2$n$, which are arranged at both sides of each of intermediate hoppers 2-1 to 2-$n$, are opened.

Weighs 10-1 to 10-$n$ are respectively arranged for each pair of a plurality of weighing hoppers 4-1 to 4-2$n$. The weight of the object to be weighed in either of two weighing hoppers, e.g., in hoppers 4-1 and 4-2, is calculated by controller 11, based on a weighing value supplied by meter 10-1.

More specifically, the number of partial weights that can enter a combination for obtaining a final target weight (preset weight) can be a maximum of twice that of meters 10-1 to 10-$n$.

Weighing hoppers 4-1 to 4-$n$ are arranged as shown in FIGS. 2 and 3 in order to detect the weights of objects to be weighed in a pair of weighing hoppers. FIG. 3 is a sectional view taken along a line I - I' in FIG. 2. For the sake of simplicity, only one pair of weighing hoppers will be explained below.

More speifically, a pair of weighing hoppers 4-1 and 4-2 each have a pentagonal section. The weighing hoppers respectively have openings 5-1 and 5-2 on the upper surface side. One inclined portion of the lower portion of each weighing hopper is openable/closable in the direction indicated by arrow 100 in FIG. 3 by discharge gate 6-1 or 6-2. The weighing hoppers are coupled so that the outer surfaces of walls 8-1 and 8-2, continuous with the other inclined portions 7-1 and 7-2, are in contact with each other. The coupled pair of weighing hoppers 4-1 and 4-2 are detachably supported on meter 10-1 by support member 9-1.

Therefore, controller 11 stores, in a memory (not shown), a weighing value in an empty state wherein no object to be weighed is stored in weighing hoppers 4-1 and 4-2, i.e., a total of self weights of weighing hoppers 4-1 and 4-2 and a self weight of support member 9-1, and the like (to be referred to as a zero-point correction value hereinafter). The weighing value in the empty state is subtracted from a weighing value obtained when an object to be weighed is stored in one weighing hopper 4-1, thereby calculating the weight (corresponding to the partial weight described above) of the object to be weighed stored in one weighing hopper 4-1. A total consisting of the weighing value in the empty state and the weight of the object to be weighed is subtracted from the weighing value when an object to be weighed is stored in the other weighing hopper 4-2, thereby enabling the weight (corresponding to the partial weight described above) of the object to be weighed stored in weighing hopper 4-2 to be calculated.

In this manner, the true weights of to-be-weighed objects stored in weighing hoppers 4-1 to 4-$n$ are calculated. In the next step, the operation for combining the respective weights of the objects is performed.

As a result of performing the combining operation, an optimal combination which can minimize a difference between a preset weight (i.e., corresponding to the final target weight described above) and a combined weight is selected, and the discharge gates of the weighing hoppers which store the selected objects to be weighed are opened by controller 11. Then, the selected objects to be weighed are discharged in the direction indicated by arrow 102, through collecting chute 12, as a product set having the desired final target weight.

New objects to be weighed are fed to empty intermediate hoppers by feeders 1-1 to 1-$n$, and are sequentially fed to the weighing hoppers which were emptied in the immediately preceding combining step. During this interval, the combine operation is performed the objects to be weighed, stored in the weighing hoppers which have already been weighed in the immediately preceding weighing step, and objects to be weighed are combined to achieve the final target weight, and are then discharged through collecting chute 12.

In the conventional combination weighing apparatus, while an object to be weighed is stored in, for instance, hopper 4-1 of a pair of weighing hoppers 4-1 and 4-2 and is weighed, an object to be weighed which is already in the other weighing hopper 4-1 and has already been weighed is not utilized for combination selection with other weighing hoppers, so as not to disturb this weighing.

More specifically, in this type of combination weighing apparatus, the weighing operation of object to be weighed is executed prior to the combining operation.

In the conventional combination weighing apparatus, in order to prevent weighing errors due to an abrupt change in temperature upon activation of the apparatus or while the apparatus is operating, and an object to be weighed attached to the weighing hopper, an operation of the apparatus is temporarily interrupted, the objects to be weighed are manually discharged, and a zero-point correction value for each meter is reset (to be referred to as a zero tracking operation hereinafter).

More specifically, the weight of an empty weighing hopper (i.e., a zero-point correction value) is drifted, with time, due to the above-mentioned variety of factors. For example, after the combination weighing apparatus is initially activated, it may be turned off during lunchtime period, and resumed operation thereafter. This being the case, the zero-point correction value may shift from a desired true correction value.

The following problems arise in connection with the conventional combination weighing apparatus:

(A) Until weighing of an object to be weighed stored in one of a pair of weighing hoppers is completed, an already weighed object to be weighed stored in the other weighing hopper cannot enter combination selection with objects to be weighed in other pairs of weighing hoppers. Therefore, the total number of combinations utilized for combination selection is decreased, and a combination precision for obtaining a product set having a final target weight is considerably degraded.

(B) During manual resetting of the zero-point correction value, drifts of meters due to changes in temperature or aging cannot be coped with, with the result that weighing errors occur. Since the operation of the apparatus is interrupted and manual resetting of the zero-point correction value must be performed frequently on all the meters, to do so is cumbersome, with the result that apparatus working efficiency is considerably degraded.

Each time operating of the apparatus resumes after being temporarily interrupted, zero tracking must be performed.

(C) If zero tracking is performed while there is a residue of a to-be-weighed object remaining in the weighing hopper, a zero-point correction value which includes this residue is utilized in the operation for calculating a partial weight until the next zero tracking is performed, even though the residue is discharged together with a new object to be weighed during the following discharge operation.

More specifically, the partial weight of an object to be weighed which is weighed and calculated during this interval (from when the residue is discharged until the next zero tracking is performed) includes a weighing error corresponding to the residue.

Therefore, when a to-be-weighed object having a particularly high adhesive property is weighed, the weighing error becomes noticeable.

(D) Since a pair of weighing hoppers are constituted by coupling a plurality of weighing hoppers, its width is increased, resulting in being disadvantageous to a space. Therefore, it is very inconvenient that the weighing hoppers are attached or detached.

During the discharge operation of the weighing hoppers, since the inertia against the meters is large, a high load is applied to the meters.

(E) Residues of to-be-weighed objects can easily become lodged in the corners between inclined portions 7-1 to 7-2n at the other side of the weighing hoppers having a pentagonal section and walls 8-1 to 8-2n continuous therewith. A to-be-weighed object having viscosity (e.g., pickles) is left attached to the other inclined portion, and cannot be discharged.

As a result, not only the zero-point correction value but also the partial weight of the object to be weighed involves an error.

[DISCLOSURE OF INVENTION]

It is an object of the present invention to provide a combination weighing apparatus which has a plurality of pairs of weighing hoppers, each pair of weighing hoppers, i.e., multi-hold hoppers being constituted by a plurality of weighing hoppers, in order to eliminate the above conventional drawbacks, wherein even while a meter to be weighed stored in the hoppers belonging to the corresponding meter, the weighed object in the hopper belonging to the corresponding meter can enter a combination weighing operation.

It is another object of the present invention to provide a combination weighing apparatus wherein zero tracking is executed automatically each time the combination weighing operation is resumed, so as to prevent the occurrence of a weighing error in the above-mentioned multi-hold hopper type combination weighing apparatus.

It is still another object of the present invention to provide a combination weighing apparatus wherein deviation measurement is performed so that a deviation in weighing value after a to-be-weighed object is stored in a weighing hopper with respect to a weighing value immediately before the to-be-weighed object is stored in the weighing hopper is regarded as a partial weight of the object to be weighed, whereby a weighing error of an object to be weighed having a sticking property can be prevented, in the above-mentioned multi-hold hopper type combination weighing apparatus.

It is still another object of the present invention to provide a combination weighing apparatus which employs weighing hoppers having a small width and a lightweight structure with which the possibility of a partial residue of an object to be weighed stored in each weighing hopper can be eliminated, and an object to be weighed having a residual property can be reliably discharged from the weighing hopper, in the above-mentioned muti-hold hopper type combination weighing apparatus.

[BRIEF DESCRIPTION OF THE DRAWINGS]

The above objects and features of the present invention will be understood from the following detailed description taken in conjunction with the accompanying drawings, in which:

FIG. 3 is a longitudinal sectional view taken along a line I - I of the hopper shown in FIG. 2;

FIG. 4 is a systematic diagram showing a basic arrangement of a combination weighing apparatus according to the present invention;

FIGS. 12 and 13 are block diagrams showing a detailed circuit of combination priority operation/control means 600 shown in FIG. 11;

FIGS. 16A and 16B are partial timing charts for explaining an operation of the control circuits shown in FIGS. 12 and 13;

FIGS. 18 to 19 are block diagrams showing a combination calculator for effectively performing zero tracking according to a third embodiment of the present invention;

FIG. 23 is a block diagram showing an arrangement for starting a first setting request unit in response to a temperature deviation, according to a sixth embodiment of the present invention.

[BEST MODE OF CARRYING OUT THE INVENTION]

Summary of Combination Weighing Apparatus

Figure 1:
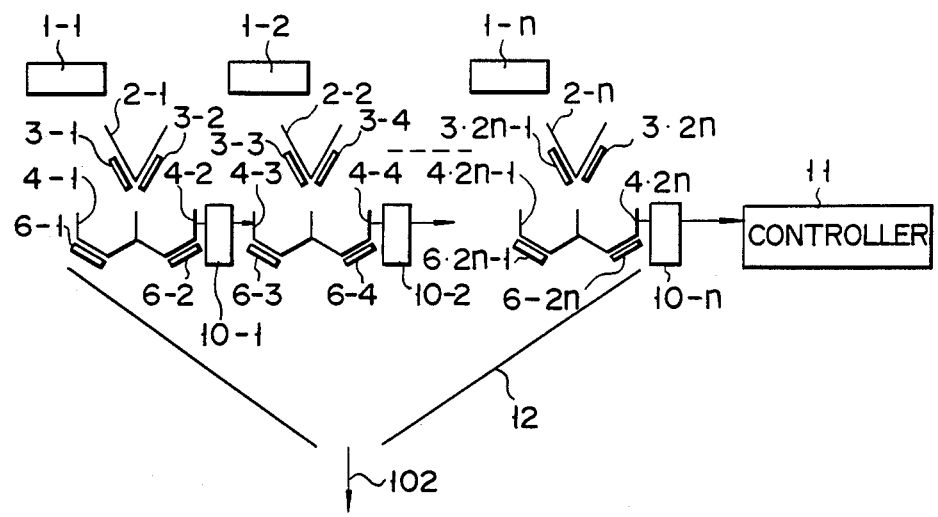
FIG. 1 is a schematic diagram showing the entire structure of a conventional combination weighing apparatus.
Figure 2:
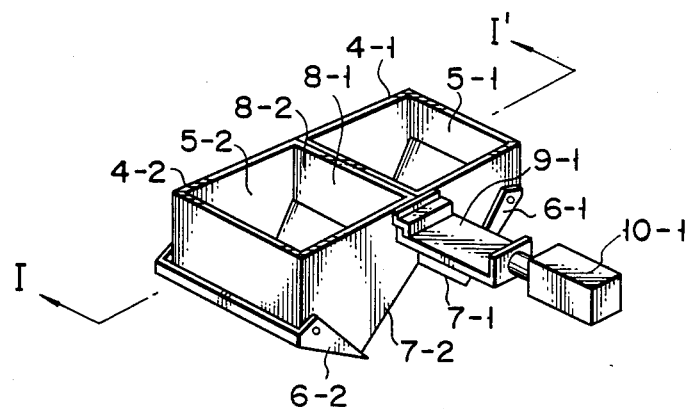
FIG. 2 is a perspective view of a weighing hopper employed in the apparatus shown in FIG. 1.

The summary of the combination weighing apparatus according to the present invention will now be described prior to a description of various preferred embodiments.

First, terms used in this specification will be defined.

(a) Multi-hold hoppers are at least two weighing hoppers coupled to constitute a group and attached to a single meter. In the following preferred embodiments, a pair of weighing hoppers are defined as a group of multi-hold hoppers, for the sake of simplicity.

(b) An object to be weighed includes foodstuffs, e.g., pickles, fruit, macaroni, candies, and the like. More specifically, products themselves have variations in weight, and can be a solid material, a powder material or a liquid material containing the solid material.

(c) A partial weight means a weight of a product stored in each weighing hopper. The partial weights are combined to obtain a desired final target weight.

The multi-hold hopper type combination weighing apparatus of the present application has the following three basic functions and feature.

(1) Function of executing a combination operation prior to a weighing operation.

(2) Function of automatically executing zero tracking (3) Function of calculating a partial weight by deviation measurement (4) Improvement of weighing hoppers As is apparent from the basic structure shown in FIG. 4, combination weighing apparatus 1000 of the present invention comprises hopper unit 400, weighing means 500, combination priority operation/control means 600, zero tracking control means 700, and deviation measurement control means 820. These three control means 600, 700, and 820 are included in control apparatus 800, and weighing means 500 and hopper unit 400 are coupled to control apparatus 800 through data bus 900.

Weighing value data, a switching control signal for hoppers, and the like are transmitted/received from/by control apparatus 800 through data bus 900.

As will be described later, combination priority operation/control means 600, zero tracking control means 700, and the deviation measurement control means in control apparatus 800 are designed to be correlated to operate simultaneously or sequentially, as needed.

Note that a wrapping apparatus for receiving and wrapping a product set discharged from hopper unit 400 is arranged below the bottom portion of hopper unit 400. However, this apparatus is not directly related to the present application, and a detailed description thereof is omitted.

Hopper Mechanism

The structure of the hopper mechanism as an embodiment of hopper unit 400 described with reference to FIG. 4 will be described with reference to FIGS. 5 to 10.

Figure 5:
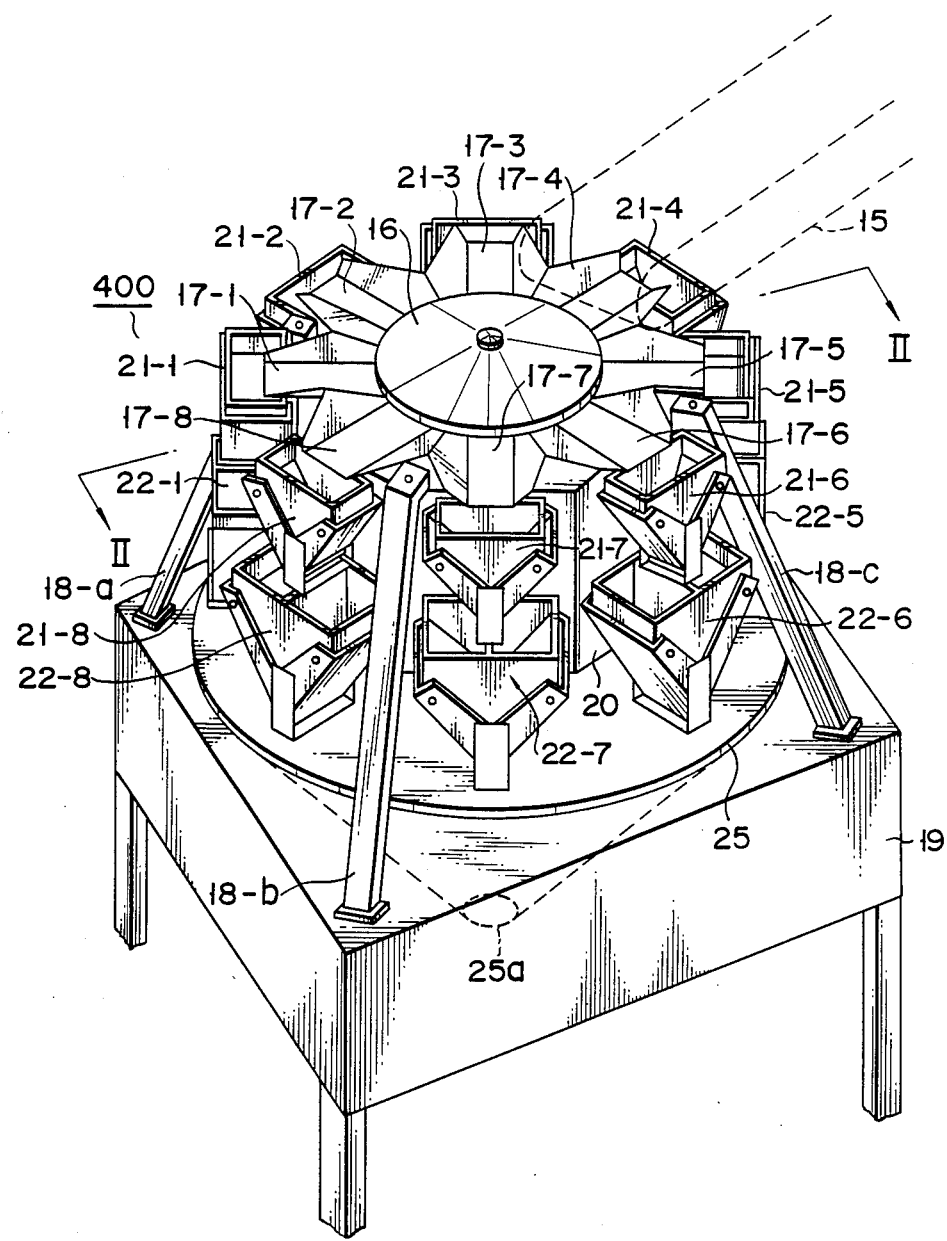
FIGS. 5 to 9B are views showing the detailed structure of hopper unit 400 of the combination weighing apparatus of the present invention.
Figure 6:
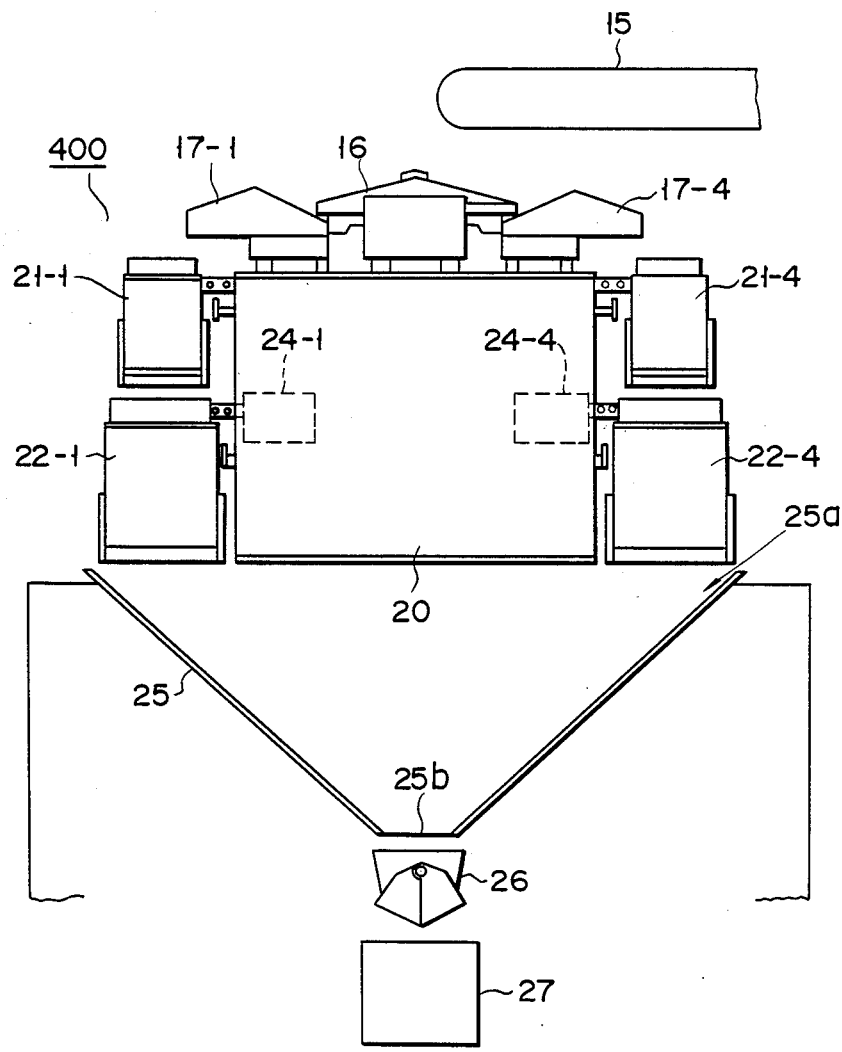

FIG. 5 is a perspective view of the hopper mechanism. FIG. 6 is a sectional view taken along a line II - II' in FIG. 5.

Referring to FIGS. 5 and 6, reference numeral 15 denotes a conveyor for sequentially conveying and feeding an object to be weighed (not shown); 16, an umbrella-like circular feeder, arranged below the convey end of conveyor 5, for conveying the object to be weighed fed from conveyor 15 toward its outer periphery by vibration; and 17-1 to 17-8, eight feeders, radially arranged below the peripheral portion of circular feeder 16, for dropping the object to be weighed fed from circular feeder 16 by vibration.

Circular feeder 16 and eight feeders 17-1 to 17-8 are mounted on the upper portion of housing 20 fixed to the upper central portion of base 19 by four columns 18a, 18b, 18c, and 18d. Intermediate hoppers 21-1 to 21-8 are arranged below feeders 17-1 to 17-8. Weighing hoppers 22-1 to 22-8 are arranged below intermediate hoppers 21-1 to 21-8. Intermediate hoppers 21-1 to 21-8 and weighing hoppers 22-1 to 22-8 are detachably attached to side surface portions 201-1 to 201-8 of housing 20 having a polygonal section.

Inside housing 20, eight meters 24-1 to 24-8 and an open/close drive mechanism (not shown) for opening/closing discharge gates of intermediate hoppers 21-1 to 21-8 and weighing hoppers 22-1 to 22-8 are housed.

Figure 7:
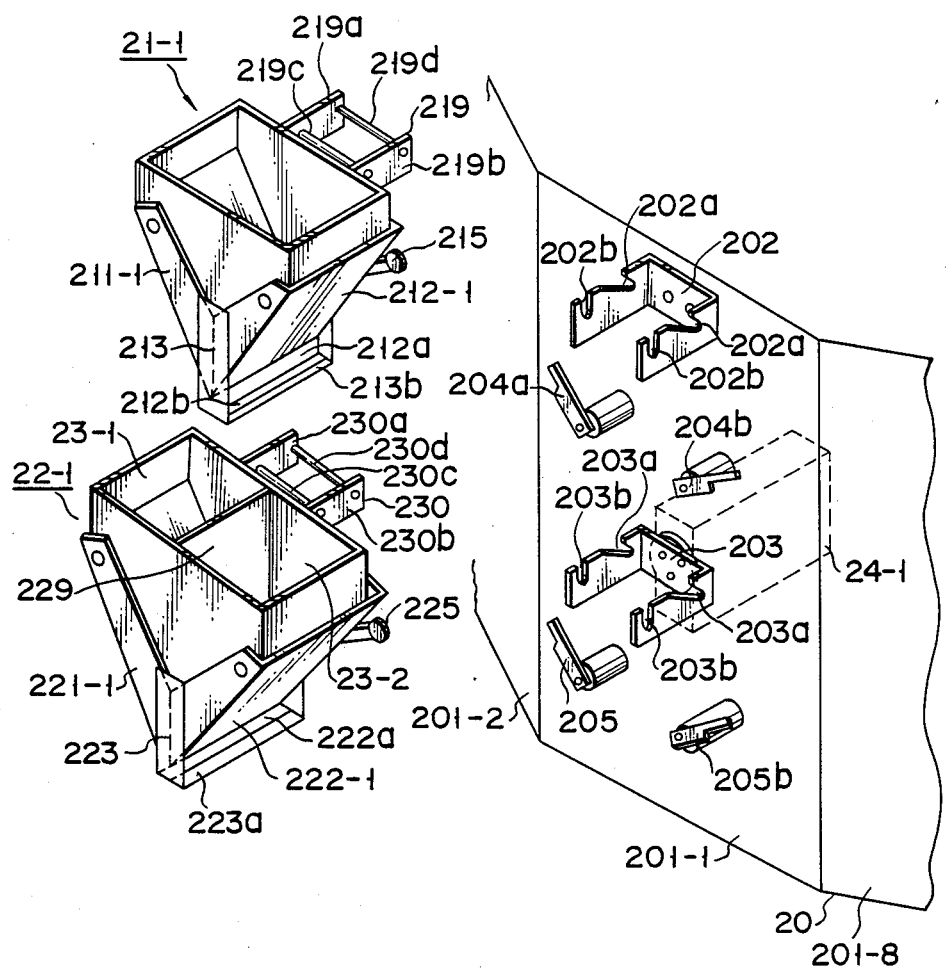

FIG. 7 is an enlarged perspective view of a part of housing 20, first intermediate hopper 21-1, and first weighing hopper 22-1.

Referring to FIG. 7, projection member 202 which has a U shape and the two opposing segments of which project outwardly from side surface portion 201-1 is mounted on the upper portion of side surface portion 201-1 of housing 20. Projection member 202 is adopted to lock intermediate hopper 21-1. For this purpose, recesses 202a and 202b are respectively formed on the upper portion of each of the opposing segments. Each recess 202a is formed downward from the upper end of the front portion, and each recess 202b is formed obliquely downward from the upper end of the rear portion.

Projection member 203 which has recesses 203a and 203b similar to those of projection member 202 in order to lock weighing hopper 22-1 and is directly coupled to meter 24-1 housed in housing 20 is arranged below projection member 202.

Drive levers 204a, 204b, 205a, and 205b directly coupled to the open/close drive apparatus in housing 20 are respectively provided below the both sides of projection members 202 and 203 so as to open/close intermediate hopper 21-1 and weighing hopper 22-1.

Intermediate Hopper

Figure 8:
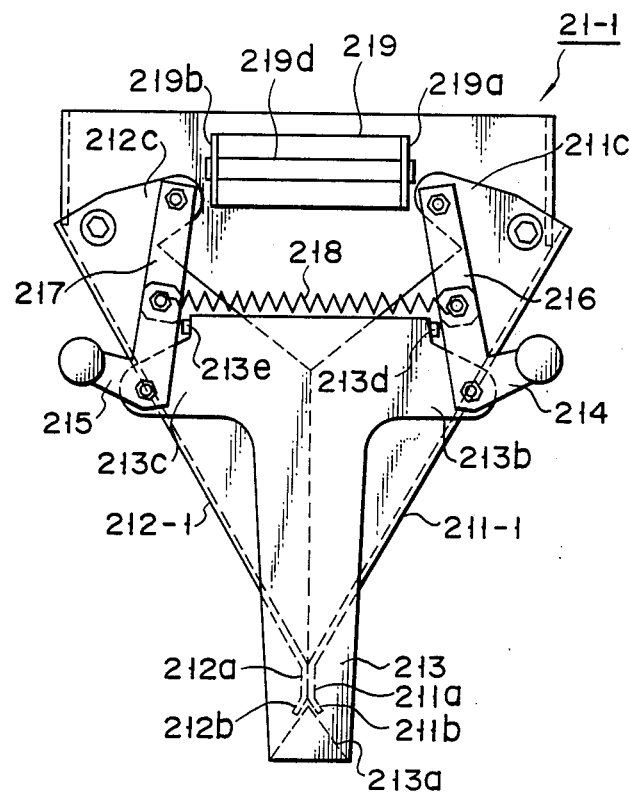

Intermediate hopper 21-1 has an upper opening and has a substantially inverted triangular shape, as shown in FIGS. 7 and 8. Discharge gates 211-1 and 211-2 are mounted on open inclined portions at the both sides of the lower portion to be pivotal outwardly.

Vertical portions 211a and 212a which are bent in the vertical direction are provided to the lower portions of discharge gates 211-1 and 212-1. Bent portions 211b and 212b are bent in the inclined directions of the corresponding discharge gates from the lower ends of vertical portions 211a and 212a.

Separation plate 213 is mounted on intermediate hopper 21-1 so as to couple its front- and rear-surface sides in a U shape. Bottom portion 213a of separation plate 213 has an inverted triangular shape along bent portions 211b and 212b of discharge gates 211-1 and 212-1.

Symmetrical right and left arm portions 213b and 213c are formed on separation plate 213 at the rear surface side of intermediate hopper 21-1. L-shaped actuation segments 214 and 215 are respectively mounted on arm portions 213b and 213c to be pivotal about their centers. Coupling plates 216 and 217 which are respectively pivotally mounted on arm portions 211c and 212c of discharge gates 211 and 212 are respectively pivotally mounted on the one end sides of actuation segments 214 and 215.

Spring 218 is engaged between the coupling portions of actuation segments 214 and 215 and coupling plates 216 and 217. Spring 218 biases actuation segments 214 and 215 inwardly. However, since stoppers 213d and 213e projecting from the upper portions of arm portions 213b and 213c of separation plate 213 abut against actuation segments 214 and 215, when discharge gates 211-1 and 212-1 are closed, actuation segments 214 and 215 and coupling plates 216 and 217 are substantially aligned along a line.

U-shaped engaging portion 219 for causing intermediate hopper 21-1 to be engaged with projection member 202 of housing 20 is provided to the upper portion of the rear surface of intermediate hopper 21-1. Engaging member 219 supports support rods 219c and 219d by opposing segments 219a and 219b, respectively.

Two support rods 219c and 219d are engaged with recesses 20a and 20b formed on the front and rear portions of projection member 202 of housing 20-1, thereby mounting intermediate hopper 21-1 on housing 20.

Weighing Hopper

Weighing hopper 22-1 arranged below intermediate hopper 21-1 has an inner volume almost twice that of intermediate hopper 21-1, and has a similar shape.

Figure 9A:
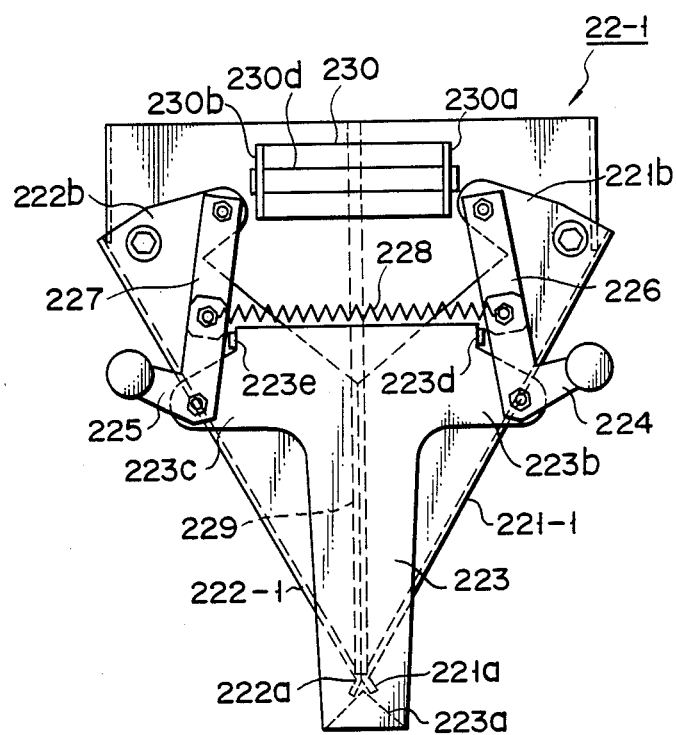

More specifically, weighing hopper 22-1 has an upper opening and has a substantially inverted triangular shape, as shown in FIGS. 7 and 9A. Discharge gates 221-1 and 221-2 are mounted on the inclined portions at the both sides.

Bent portions 221a and 222 which are bent in the inclined direction of the corresponding discharge gates are respectively formed on the lower portions of discharge gates 221-1 and 222-1. Similarly to intermediate hopper 21-1 shown in FIG. 8, U-shaped separation plate 223 having substantially inverted-triangular bottom portion 223a formed along bent portions 221a and 222a is mounted to couple the front- and rear-surface sides of weighing hopper 22-1.

Symmetrical arm portions 223b and 223c are formed on separation plate 223 at the rear surface side of the weighing hopper. Similarly, actuation segments 224 and 225 are pivotally mounted on these arm portions 223b and 223c, and coupling plates 226 and 227 for coupling the one end sides of actuation segments 224 and 225 and arm portions 221b and 222b of discharge gates 221 and 222 are pivotally mounted thereon.

Spring 228 is engaged between the coupling portions of actuation segments 224 and 225 and coupling plates 226 and 227, and stoppers 223b and 223e projecting from the upper portions of arm portions 223b and 223c of separation plate 223 similarly regulate inward movement of actuation segments 224 and 225, respectively.

Partition plate 229 is mounted at the inner central portion of weighing hopper 22-1 to be in contact with bent portions 221a and 222a of discharge gates 221 and 222 from the above. In weighing hopper 22-1, two storage chambers 23-1 and 23-2 are defined by partition plate 229.

U-shaped engaging member 230 for causing weighing hopper 22-1 to engage with projection member 230 which projects to be directly coupled to meter 24-1 in housing 20 is provided on the upper portion of the rear surface of weighing hopper 22-1. Two support rods 230c and 230d are supported by intermediate hopper 21-1 and opposing sides 230a and 230b of engaging portion 230.

Engaging portion 230 is engaged with projection member 203 of the housing, and hence, weighing hopper 22-1 is supported by meter 24-1.

When intermediate hopper 21-1 and weighing hopper 22-1 are mounted on side surface 201-1 of the housing, the free end sides of actuation segments 214, 215, 224, and 226 of the respective hoppers are located below drive levers 204a, 204b, 205a, and 205b provided to side surface 201-1 of the housing. Therefore, as shown in FIG. 9B, for example, when actuation segment 224 of weighing hopprr 22-1 is pivoted counterclockwise indicated by arrow 250 by drive lever 205a, the one end side of actuation segment 224 is pivoted outwardly, and coupling plate 226 is also moved clockwise. As a result, discharge gate 221-1 is opened. When drive lever 205a is deenergized, the one end side of actuation segment 224 closes discharge gate 221-1 by the biasing force of spring 228.

As shown in FIG. 5, collecting chute 25 is arranged below weighing hoppers 22-1 to 22-8 with the above structure. Chute 25 has circular opening 25a to receive a plurality of objects to be weighed discharged from weighing hoppers 22-1 to 22-8, and has a conical shape with an open end. Discharge port 25b for discharging objects to be weighed below base 16 is formed on collecting chute 25.

Reference numeral 26 denotes a discharge hopper for temporarily storing an object to be weighed collected by collecting chute 25 and discharging the collected object at a predetermined timing; and 27, a wrapping apparatus for wrapping the object discharged from discharge hopper 26.

As can be seen from the above description, the weighing hopper as one characteristic feature of the present invention has a substantially inverted triangular section. Furthermore, the vertical partition plate is arranged in the weighing hopper to define a plurality of storage chambers. The entire lower portions of the storage chambers are open, and the discharge gates which can be almost vertically open are provided to the inclined surface sides of the respective storage chambers. Therefore, a width of the weighing hopper of this invention can be decreased as compared to that of the conventional weighing hopper. As a result, a space factor can be improved, and the hoppers can be easily attached or detached. Since an object to be weighed is collected at substantially the central portion of the weighing hopper, an inertia against the meter can be reduced during the discharge operation of the weighing hopper, and no load is applied on the meter. In addition, since the entire lower portion of the storage chamber can be open, a residue of an object to be weighed is not easily left and an object to be weighed having viscosity can be reliably discharged.

Figure 10:
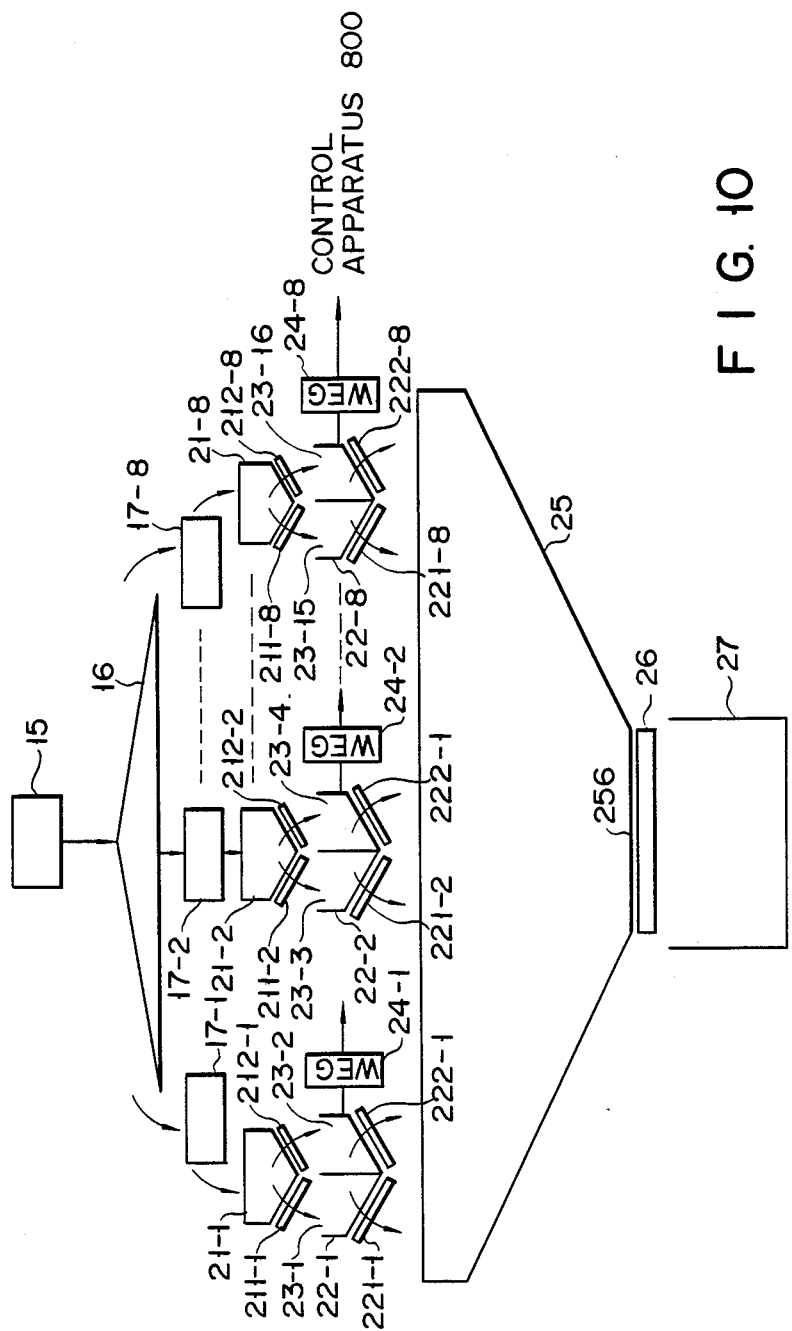
FIG. 10 is a diagram illustrating hopper unit 400 and weighing means 500 shown in FIG. 4.

FIG. 10 functionally shows the entire structure of the hopper mechanism described above in detail. Reference numerals in FIG. 10 correspond to those of elements in FIGS. 5 to 9B.

The functional diagram of FIG. 10 is convenient for explaining the operation of control means 600, 700, and 820 to be described below.

Combination Operation Priority System

A combination operation priority system as the second characteristic feature of the present invention in the combination weighing apparatus will now be described below.

Figure 11:
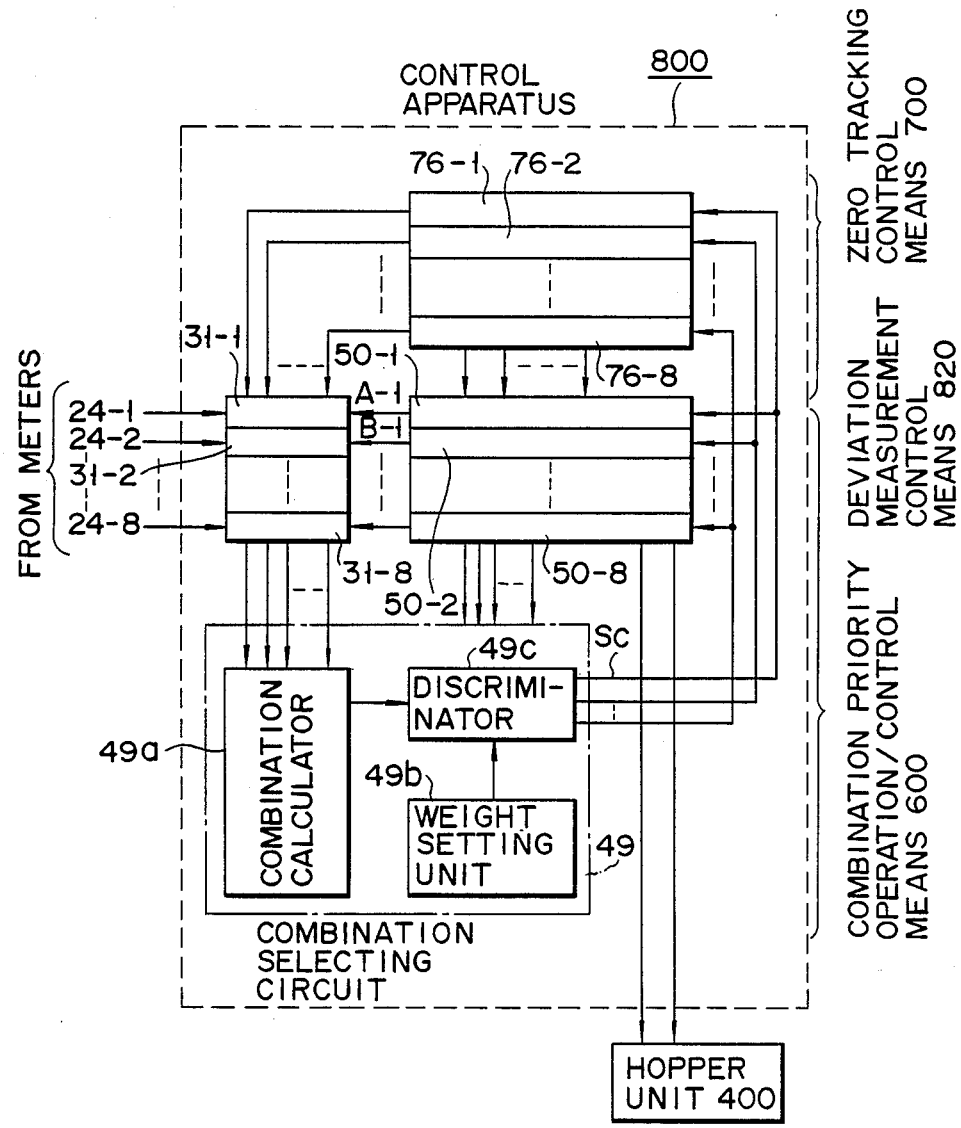
FIG. 11 is a block diagram showing an internal arrangement of control apparatus 800 shown in FIG. 4.

FIG. 11 is a block diagram of an internal circuit of combination priority operation/control means 600 for controlling such that the combination operation is executed prior to measurement Combination priority operation/control means 600 comprises weighing value operation circuits $31_1$ to $31_8$, combination selection circuit 49, and discharge/feed control circuits $50_1$ to $50_8$, in the embodiment shown in FIG. 11. However, since correction value setting circuits 76-1 to 76-8 corresponding to zero tracking control means 700 and deviation measurement control means 820 (to be described later) are associated with operation/control unit 600, they are also illustrated in FIG. 11.

Circuit Arrangement (Weighing Value Operation Circuit)

Weighing signals from meters 24-1 to 24-8 shown in FIG. 10 are respectively sent to weighing value operation circuits 31-1 to 31-8. In weighing value operation circuits 31-1 to 31-8, weights independent of weight measurement of objects to be weighed, such as weights of weighing hoppers 22-1 to 22-8, are zero-piont corrected, and the weights of objects to be weighed stored in the storage chambers of the weighing hoppers are calculated.

Weighing value operation circuit 31-1 is arranged as shown in, e.g., FIG. 12.

Referring to FIG. 12, a weighing signal from meter 24-1 is input to first and second subtractors 32-1 and 33-1. In first subtractor 32-1, zero-point correction value 0adj stored in correction value memory 34-1 is subtracted from the input weighing value.

The output from subtractor 32-1 is input to third subtractor 36-1 through switch 35-1. In third subtractor 36-1, the output from adder 41-1 is subtracted from the input value. The output from adder 41-1 is also input to second subtractor 33-1. In subtractor 33-1, the output from adder 41-1 is subtracted from the weighing value from meter 24-1, and the difference is stored in correction value memory 34-1 through switch 45-1.

The output from third subtractor 36-1 is stored in first and second weight memories 39-1 and 40-1 through switches 37-1 and 38-1, respectively.

First and second weight memories 39-1 and 40-1 respectively store the weights of objects to be weighed stored in, e.g., a pair of storage chambers 23-1 and 23-2 of weighing hopper 22-1 shown in FIG. 10. When these objects to be weighed are discharged, their storage contents are reset. The storage contents of memories 39-1 and 40-1 can be retained even if the power source of apparatus 100 is turned off.

The storage values of first and second memories 39-1 and 40-1 are added to each other by adder 41-1, and the sum is output to second and third subtractors 33-1 and 36-1. The sum is also sent to combination selection circuit 49 shown in FIG. 11.

Switch 37-1 is turned on in response to measurement end signal A-1 supplied to discharge/feed control circuit 50-1 (to be described later; in FIG. 11) which indicates that an object to be weighed is fed to one storage chamber 23-1 and its weighing is completed. Similarly, switch 38-1 is turned on in response to measurement end signal B-1 supplied to discharge/feed control circuit 50-1 (to be described later; in FIG. 11) which indicates that an object to be weighed is fed to one storage chamber 23-2 and its weighing is completed.

These measurement end signals A-1 and B-1 are input to one input terminal of AND gate 43-1 through OR gate 42-1.

The other input terminal of AND gate 43-1 receives an inverted signal of deviation measurement signal Y-1 (to be described later) from inverter 44-1. Switch 35-1 is switched depending on the output from AND gate 43-1 as follows. When the output from AND gate 43-1 is at "H (High)" level, the output from first subtractor 32-1 is input to third subtractor 36-1. When the output from AND gate 43-1 is at "L (Low)" level, the output from first subtractor 32-1 is supplied to switches 37-1 and 38-1.

The switching operation of switch 45-1 is controlled by AND gate 46-1. When the output from AND gate 46-1 is at "H" level, switch 45-1 is turned on, and when it is "L" level, it is turned off. One input terminal of AND gate 46-1 receives the output from inverter 44-1, and the other input terminal thereof receives correction value setting signal P-1 (to be described later).

Switch 47-1 is turned on when the output from AND gate 48-1 is at "H" level, so as to cause correction value memory 34-1 to store the weighing value from meter 24-1. One input terminal of AND gate 48-1 receives deviation measurement signal Y-1, and the other input terminal thereof receives correction value setting signal P-1.

Note that since other weighing value operation circuits 31-2 to 32-8 are also arranged in the same manner as described above in correspondence with meters 24-2 to 24-8, a detailed description thereof will be omitted.

Combination selection circuit 49 shown in FIG. 11 is arranged as follows. More specifically, circuit 49 comprises combination calculator 49a for calculating a combined weight of objects to be weighed under all the different combination conditions based on the weights of storage chambers 23-1 to 23-16 stored in first and second weight memories 39-1 to 39-8 and 40-1 to 40-8 of weighing value operation circuits 31-1 to 31-8, weight setting unit 49b for setting a preset weight, and discriminator 49c for comparing the combined weight output from combination calculator 49a and the preset weight (i.e., corresponding to the final target weight) from weight setting unit 49b and discriminating an optimal combination so as to output combination sort signal Sc.

Combination selection circuit 49 is started in response to a combination request signal (not shown) from wrapping apparatus 27.

(Discharge/Feed Control Circuit)

When discharge/feed control circuits 50-1 to 50-8 receive combination sort signal Sc from discriminator 49c, they open discharge gates 221-1 to 222-8 of designated storage chambers 23-1 to 23-16 to discharge objects to be weighed. Thereafter, circuits 50-1 to 50-8 close opened discharge gates 221-1 to 222-8 and open discharge gates of 211-1 to 212-8 of intermediate hoppers 21-1 to 21-8 corresponding to the weighing hoppers which discharged the objects.

Figure 13:
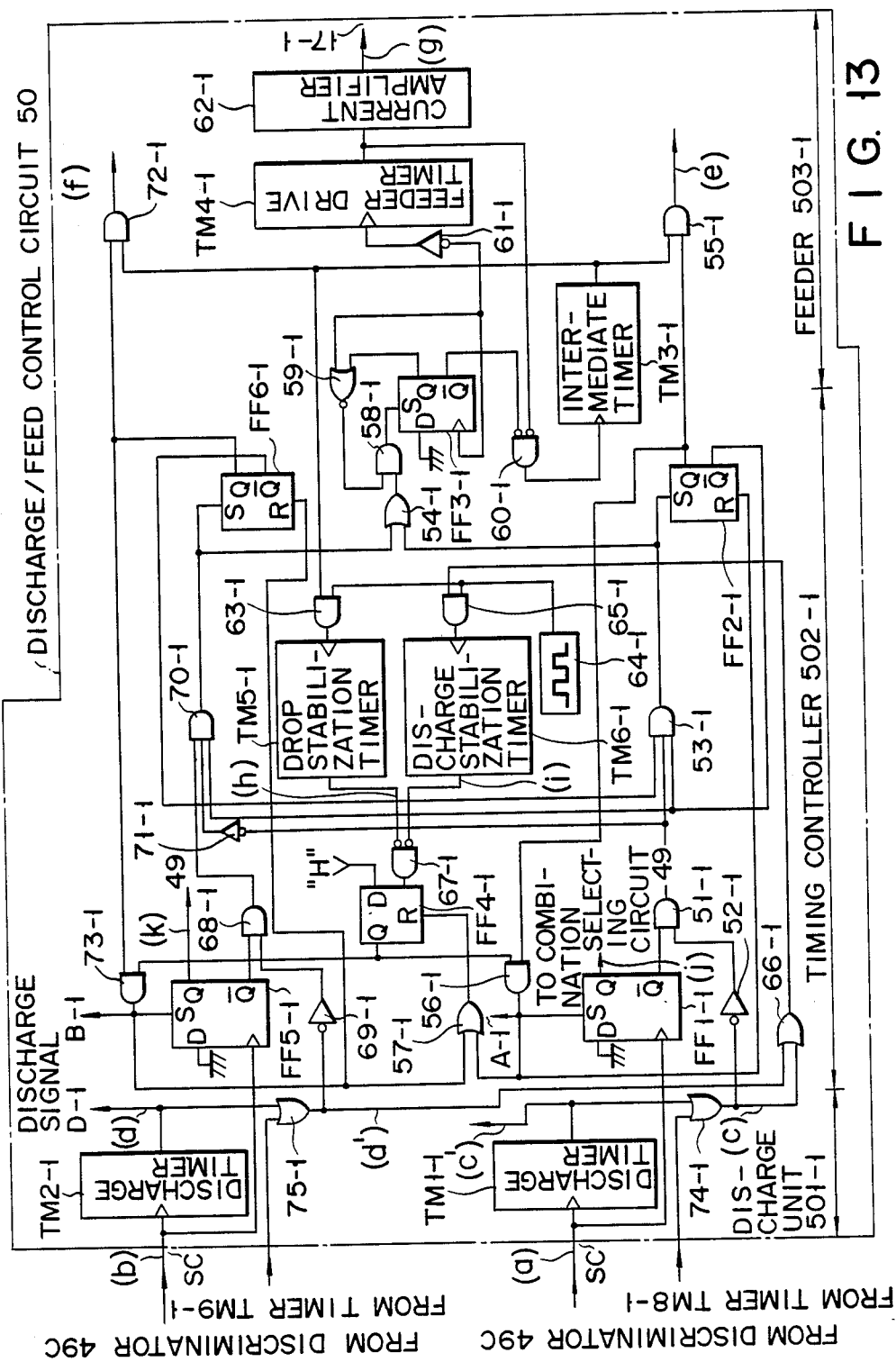

Discharge/feed control circuit 50-1 mainly comprises discharge unit 501-1, timing controller 502-1, and feed unit 503-1, as shown in FIG. 13. The arrangement of control circuit 50-1 will now be described with reference to FIG. 13.

Referring to FIG. 13, combination sort signal Sc from combination selection circuit 49 is input to discharge timers TM1-1 and TM2-1 in correspondence with left and right storage chambers 23-1 and 23-2 of weighing hopper 22-1. Discharge timers TM1-1 and TM2-1 comprise, e.g., multivibrators. Upon input of a pulse, the timer generates an "H" level voltage during predetermined time T1 (i.e., corresponding to a time interval during which an object to be weighed can be completely discharged from the storage chamber) from the leading edge of the input pulse. The output from discharge timer TM1-1 resets the storage content of weight memory 39-1 (FIG. 12) of weighing value operation circuit 31-1 shown in FIG. 1 as discharge signal D-1, and is sent to the open/close drive apparatus so as to open/close discharge gate 221-1 at the side of storage chamber 23-1.

Similarly, the output from discharge timer TM2-1 resets the storage content of weight memory 40-1 of weighing value operation circuit 31-1 as discharge signal D-1, and is sent to the open/close drive apparatus (shown but not in detail) so as to open/close discharge gate 212 at the side of storage chamber 23-2. Combination sort signal Sc input to discharge timer TM1-1 in correspondence with left storage chamber 23-1 is input to the clock input of D-type flip-flop FF-1. The D input of flip-flop FF1-1 is fixed at "L" level (ground potential), and its output Q is sent to combination selection circuit 49 as a combination enable signal (see FIG. 11). Inverted output Q of flip-flop FF1-1 is input to one input terminal of AND gate 51-1. The other input terminal of AND gate 51-1 receives an inverted signal of the output from discharge timer TM1-1 through OR gate 74-1 and inverter 52-1 (to be described later). The output from AND gate 51-1 is input to the first input terminal of 3-input AND gate 53-1. The output from AND gate 53-1 is input to the set terminal of R-type flip-flop FF2-1, and is also input to one input terminal of OR gate 54-1.

Inverted output Q of flip-flop FF2-1 is input to the second input terminal of AND gate 53-1, and output Q is input to one input terminal of AND gate 55-1 and to one input terminal of AND gate 56-1.

The output from AND gate 56-1 is input to the set terminal of flip-flop FF1-1, the reset terminal of flip-flop FF2-1 and one input terminal of OR gate 57-1. The output from AND gate 56-1 causes switch 37-1 of weighing value operation circuit 31-1 shown in FIG. 12 to be turned on/off as measurement end signal A-1.

The output from OR gate 54-1 is input to one input terminal of AND gate 58-1, and the output from AND gate 8-1 is input to the set terminal of D-type flip-flop FF3-1. The D input of flip-flop FF3-1 is fixed at "L" level, and its output Q is input to one input terminal of NOR gate 59-1.

The output from NOR gate 59-1 is input to the other input terminal of AND gate 58-1. Inverted output Q of flip-flop FF3-1 is input to one input terminal of NOR gate 60-1. The output from NOR gate 60-1 is input to intermediate timer TM3-1. Upon reception of a pulse, intermediate timer TM3-1 outputs an "H"-level signal during predetermined time T2 (i.e., corresponding to a time interval during which an object to be weighed is completely discharged from an intermediate hopper) from the leading edge of the input pulse.

The output from intermediate timer TM3-1 is input to the other input terminal of AND gate 55-1, and the output from AND gate 55-1 serves as a signal output for opening/closing discharge gate 21-1 of intermediate hopper 21-1 corresponding to left storage chamber 23-1 of weighing hopper 22-1. The output from intermediate timer TM3-1 is input to the clock input of flip-flop FF3-1 and the other input terminal of NOR gate 59-1, and is also input to feeder drive timer TM4-1 through inverter 61-1.

Feeder drive timer TM4-1 outputs, to current amplifier 62-1 and the other input terminal of NOR gate 60-1, an "H"-level output during predetermined time T3 (i.e., corresponding to a time interval required for feeding a substantially predetermined amount of an object to be weighed to the intermediate hopper) from the leading edge of the input pulse. Current amplifier 62-1 drives feeder 17-1 during the "H"-level interval of the output from feeder drive timer TM4-1.

The output from intermediate timer TM3-1 is also input to one input terminal of AND gate 63-1. The other input terminal of AND gate 63-1 receives a rectangular wave output from rectangular wave oscillator 64-1.

The output from AND gate 63-1 is input to feed stabilization timer TM5-1. Feed stabilization timer TM5-1 outputs an "H"-level output during predetermined time T4 (i.e., corresponding to a time interval from when an object to be weighed is dropped and fed to the weighing hopper until its weighing value is stabilized) from the leading edge of the input pulse. Feed stabilization timer TM5-1 is a re-trigger type timer which again holds its output at "H" level for next time T4 from when the next pulse is input during the timer operation.

The output from rectangular wave oscillator 64-1 is also input to one input terminal of AND gate 65-1. The other input terminal of AND gate 65-1 receives the output from OR gate 66-1 which receives the outputs from discharge timers TM1-1 and TM2-1.

The output from AND gate 65-1 is input to discharge stabilization timer TM6-1. Discharge stabilization timer TM6-1 outputs an "H"-level voltage (i.e., corresponding to a time interval from when an object to be weighed is discharged from the weighing hopper until the meter is stabilized) from the leading edge of the input pulse.

Discharge stabilization timer TM6-1 is a re-trigger type timer which again holds its output at "H" level for next time T5 when the next pulse is input during the timer operation in the same manner as in feed stabilization timer TM5-1.

The outputs from timers TM5-1 and TM6-1 are input to the two input terminals of NOR gate 67-1. The output from NOR gate 67-1 is input to the clock input of D-type flip-flop FF4-1. The D input of flip-flop FF4-1 is fixed at "L" level, and its output Q is input to the other input terminal of AND gate 56-1. The reset terminal of flip-flop FF4-1 receives the output from OR gate 57-1.

The combination sort signal input to discharge timer TM2-1 in correspondence with right storage chamber 23-2 is input to the clock input of D-type flip-flop FF5-1 whose D input is fixed at "L" level in the same manner as in the left storage chamber. Output Q of flip-flop FF5-1 is sent to combination selection circuit 49 as a combination enable signal (see FIG. 11), and its inverted output Q is input to one input terminal of AND gate 68-1. The other input terminal of AND gate 68-1 receives an inverted signal of the output from discharge timer TM2-1 through OR gate 75-1 and inverter 69-1 (to be described later).

The output from AND gate 68-1 is input to the first input terminal of 3-input AND gate 70-1. The second input terminal of AND gate 70-1 receives an inverted signal of the output from AND gate 51-1 through inverter 71-1. The third input terminal receives inverted output Q of flip-flop FF2-1.

The output from AND gate 70-1 is input to the set terminal of RS-type flip-flop FF6-1, and to the other input terminal of OR gate 54-1. Inverted output Q of flip-flop FF6-1 is input to the third input terminal of AND gate 53-1, and its output Q is input to one input terminal of each of two AND gates 72-1 and 73-1.

The other input terminal of AND gate 72-1 receives the output from intermediate timer TM3-1. The output from AND gate 72-1 serves as a signal output for opening/closing discharge gate 212-1 of intermediate hopper 21-1 corresponding to right storage chamber 23-2 of weighing hopper 22-1.

The other input terminal of AND gate 73-1 receives output Q from flip-flop FF4-1. The output from AND gate 73-1 is input to the set terminal of flip-flop FF5-1, the reset terminal of flip-flop FF6-1, and the other input terminal of OR gate 57-1. The output from AND gate 73-1 causes switch 38-1 of weighing value operation circuit 31-1 to be turned on/off as measurement end signal B-1 (see FIG. 12).

Note that the other input terminal of each of OR gates 74-1 and 75-1 at the output side of discharge timers TM1-1 and TM2-1 is connected to correction value setting circuit 76-1 (to be described later).

Note that correction value setting circuit 76-1 is related directly to the zero tracking operation and the deviation measurement operation as the second and third characteristic features of the present invention, and will be described below in detail.

Zero Tracking System

Two zero tracking functions involved in the zero tracking system as the second characteristic feature of the present invention will be described below.

(1) Function of resetting a zero-point correction value of a meter corresponding to a weighing hopper which has not been subjected to discharge/feed operations over a predetermined period of time (2) Function of performing zero tracking when two storage chambers of pairs of storage chambers 23-1 to 23-16 are emptied at the same time in any of weighing hoppers 22-1 to 22-8

Deviation Measurement System

A deviation measurement system as the third characteristic feature of the present invention will now be described.

The deviation measurement system is a function of subtracting a weighing value immediately before a new object to be weighed is stored in storage chambers 23-1 to 23-16 of any of weighing hoppers 22-1 to 22-8 from a weighing value after storage, thereby calculating a partial weight.

The zero tracking and deviation measurement operations are mainly performed by correction value setting circuit 76 in control apparatus 800 shown in FIG. 11.

The deviation measurement system is a system capable of obtaining a partial weight by subtracting weighing values during a very short period of time, i.e., immediately before and after storage of the object to be weighed. With this system, the drift of meters can be ignored (i.e., no zero tracking system is required), and a weighing error due to the influence of an object to be weighed left in the weighing hopper is small. Therefore, this system is effective when an object which easily leaves a residue is to be weighed.

Correction Value Settinq Circuit

Correction value setting circuits 76-1 to 76-8 initialize zero-point correction values for respective meters 24-1 to 24-8 of weighing value operation circuits 31-1 to 31-8 upon starting of combination weighing apparatus 1000, and appropriately reset new zero-point correction values in correction value memories 34-1 to 34-8, thereby preventing a weighing error due to temperature or time drift of meters 24-1 to 24-8 and dregs of objects to be weighed (steadily present) attached to weighing hoppers 22-1 to 22-8.

Correction value setting circuits 76-1 to 76-8 also include circuits for causing correction value memories 34-1 to 34-8 to store weighing values immediately before objects to be weighed are stored in weighing hoppers 22-1 to 22-8 instead of zero-point correction values for respective meters 24-1 to 24-8 and to calculate partial weights by deviation measurement.

Circuit Arrangement of Correction Value Setting Circuit

Figure 14:
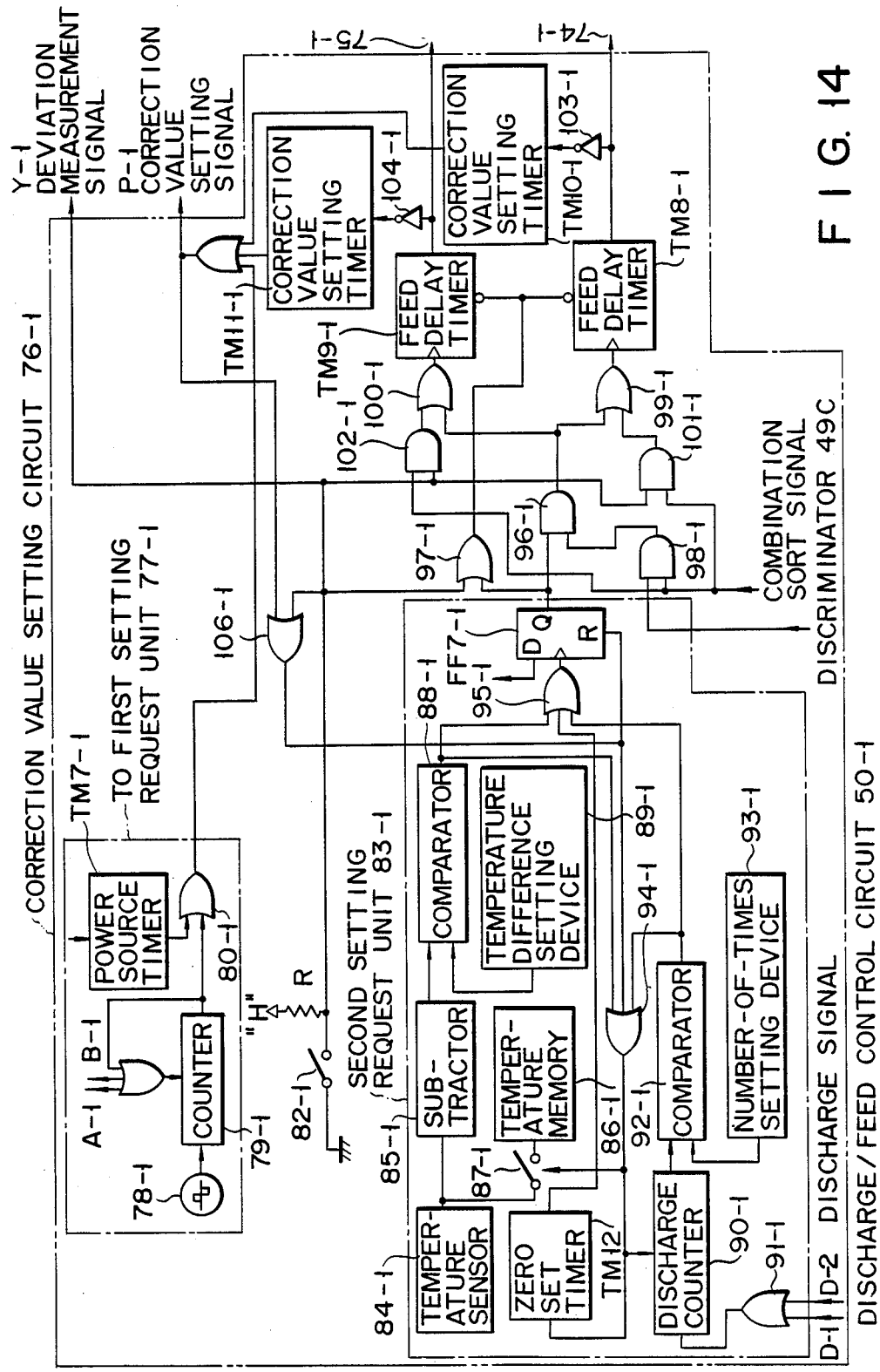
FIG. 14 is a block diagram showing a detailed circuit of zero tracking control means 700 and deviation measurement control means 820 shown in FIG. 11.

Correction value setting circuit 76-1 is arranged as shown in, e.g., FIG. 14.

Referring to FIG. 14. reference numeral 77-1 denotes a first setting request unit for initially setting a zero-point correction value in correction value memory 34-1 of weighing value operation circuit 31-1 shown in FIG. 12 when the power source of apparatus 1000 is turned on and forresetting the zero-point correction value when a predetermined time has passed without performing a discharge/feed operation of objects to be weighed in weighing hopper 22-1. More specifically, this unit has the first function of the zero tracking functions described above.

First setting request unit 77-1 comprises oscillator 78-1 for outputting pulses having a predetermined period, counter 79-1 for counting the pulses from oscillator 78-1 and for, when the count result has reached a predetermined number, i.e., when a predetermined period of time (e.g., 6 minutes) has passed, outputting an "H"-level pulse, power source timer TM7-1 for outputting a pulse having a predetermined pulse width when the power source of the apparatus is turned on, OR gate 80-1 for deriving a logical sum between the outputs from counter 79-1 and power source timer TM7-1, and OR gate 81-1 for deriving a logical sum between measurement end signals A-1 and B-1 from discharge/feed control circuit 50-1 and the output from counter 79-1 and resetting counter 79-1 by its output.

Reference numeral 82-1 denotes a deviation measurement switch, one end of which is conected to an earth potential ("L" level) and the other end of which is connected to a power source ("H" level) through resistor R. When switch 82-1 is manually turned on, it outputs "H"-level deviation measurement signal Y-1.

Reference numeral 83-1 denotes a second setting request unit for resetting the zero-point correction value when a temperature deviation around meter 24-1 exceeds a predetermined value or an object to be weighed is discharged from weighing hopper 22-1 over a predetermined number of times.

In second setting request unit 83-1, reference numeral 84-1 denotes a temperature sensor for detecting an ambient temperature of meter 24-1; and 85-1, a subtractor for subtracting the storage value stored in temperature memory 86-1 from the temperature detected by temperature sensor 83-1.

Temperature memory 86-1 stores a temperature from temperature sensor 84-1 input through switch 87-1.

Reference numeral 88-1 denotes a comparator for comparing a reference temperature from temperature setting device 89-1 prestoring a predetermined reference temperature (e.g., 0.5° C.) with the output from subtractor 85-1 and for, when the output from subtractor 85-1 is equal to or larger than the reference temperature, outputting an "H"-level signal and, when it is smaller than the reference temperature, outputting an "L"-level signal. Reference numeral TM12 denotes a zero-set timer for outputting an "L"-level signal for a predetermined period of time (e.g., 6 minutes) since a pulse signal is input and thereafter outputting an "H"-level signal. Zero-set timer TM12 is a re-trigger type timer which re-outputs an "L"-level signal for a predetermined period of time (6 minutes) since the next pulse signal is input during the timer operation and thereafter outputs an "H"-level signal.

Reference numeral 90-1 denotes a discharge counter for counting discharge signal D-1 from discharge/feed control circuit 50-1 input through OR gate 91-1 and outputting a count value.

Reference numeral 92-1 denotes a comparator for comparing the count value from counter 90-1 with a reference number of times from number-of-times setting device 93-1 in which a predetermined number of times (e.g., 10) is set beforehand and for, when the count value from counter 90-1 is larger than the reference number of times, outputting an "H"-level signal and, when the count value is smaller than the reference number of times, outputting an "L"-level signal.

The "H"-level outputs from comparators 88-1 and 92-1 are input to zero set timer TM12 through OR gate 94-1 and turn on switch 87-1, thereby resetting discharge counter 90-1.

The outputs from comparators 88-1 and 92-1 and zero set timer TM12 are input, through OR gate 95-1, to the clock terminal of flip-flop FF7-1 whose D input is fixed at "H" level. Output Q of flip-flop FF7-1 is input to one input terminal of each of AND gate 96-1 and OR gate 97-1.

The other input terminal of AND gate 96-1 receives the output from AND gate 98-1 which receives the combination sort signal from combination selection circuit 49. The output from AND gate 96-1 is input to one input terminal of each of OR gates 99-1 and 100-1. The other input terminal of OR gate 97-1 receives deviation measurement signal Y-1.

The other input terminal of OR gate 99-1 is connected to the output from AND gate 101-1 which receives the combination sort signal from combination selection circuit 49 corresponding to left storage chamber 23-1 and deviation measurement signal Y1. The other input terminal of OR gate 100-1 is connected to the output from AND gate 102-1 which receives the combination sort signal corresponding to right storage chamber 23-2 and deviation measurement signal Y1.

The outputs from OR gates 99-1 and 100-1 are respectively input to feed delay timers TM8-1 and TNM9-1 each of which has time constant "T6" corresponding to a substantially total (T1+T5) of time constant "T1" of discharge timers TM1-1 and TM2-1 and time constant "T5" of discharge stabilization timer TM6-1. The outputs from these timers are connected to one input terminal of each of OR gates 74-1 and 75-1 of discharge/feed control apparatus 50-1 (FIG. 13), and to OR gate 105-1 respectively through inverters 103-1 and 104-1 and correction value setting timers TM10-1 and TMl1-1 having very small time constant T7.

OR gate 105-1 also receives the output from first setting request unit 77-1. The output from OR gate 105-1 is supplied to weighing value operation circuit 31-1 and to the reset terminal of flip-flop FF7-1 and OR gate 94-1 as a reset signal through OR gate 106-1.

Operation of Correction Value Setting Circuit

The operation of correction value setting circuit 76-1 with the above arrangement will now be described.

When the power switch of apparatus 1000 is turned on (i.e., an operation is initiated) while deviation measurement switch 82-1 is kept on, correction value setting signal P-1 for initialization generated by first setting request unit 77-1 is output to weighing value operation circuit 31-1 (first function of zero tracking).

When any of a temperature difference, an elapsed time, and the number of discharge times from the initialization exceeds a reference value (0.5° C., 6 minutes, or 10 times), output Q of flip-flop FF7-1 goes to "H" level. Only when two combination sort signals are input at the same time, feed delay timers TM8-1 and TM9-1 are operated, and thereafter, correction value setting signal P-1 is output.

In correction value setting circuit 76-1, each time correction value setting signal P-1 is output, zero set timer TM12 is energized. The storage value of temperature memory 86-1 is updated, and discharge counter 90-1 is reset.

Similarly, when any of temperature difference, an elapsed time, and the number of discharge times from the immediately preceding setting of the zero-point correction value exceeds the reference value, output from flip-flop FF7-1 goes to "H" level. In this state, when the two combination sort signals are input at the same time, correction value setting signal P-1 is output to weighing value operation circuit 31-1 (corresponding to zero-tracking function No. 2).

When no object to be weighed is discharged from weighing hopper 21-1 for a predetermined period of time (6 minutes), first setting request unit 77-1 outputs correction value setting signal P-1 to weighing value operation circuit 31-1 (corresponding to zero tracking function No. 1).

When the power switch of apparatus 1000 is turned on while deviation measurement switch 82-1 is turned off, deviation measurement signal Y-1 and correction value setting signal P-1 are output to weighing value operation circuit 31-1, and initialization for deviation measurement is performed.

If the combination sort signal is input after this initialization, the feed delay timer corresponding to the input combination sort signal (at least one of TM8-1 and TM9-1) is operated. After the operation, correction value setting signal P-1 is output to weighing value operation circuit 31-1, and deviation measurement is performed.

Note that combination weighing apparatus 1000 comprises 8 sets each consisting of weighing value operation circuit 31-1, discharge/feed control circuit 50-1, and correction value setting circuit 76-1 for each of meters 24-1 to 24-8.

First Operation Mode of Combination Weighing Apparatus

Combination weighing apparatus 1000 of the present invention executes the above-mentioned weighting hopper combination priority operation, zero tracking function, and deviation measurement function in a correlated manner. The first operation mode (zero tracking mode) of the multi-hold hopper type combination weighing apparatus will now be described.

Explanation of Operation of Hopper Unit

The discharge and feed operations of the mechanism of hopper unit 400 will first be described.

As shown in FIGS. 5 and 6, objects to be weighed (not shown) fed to circular feeder 16 from conveyor 15 are stored in intermediate hoppers 21-1 to 21-8 by feeders 17-1 to 17-8, respectively. At this time, for example, if no object to be weighed is stored in, e.g., a pair of storage chambers 23-1 and 23-2 of weighing hopper 22, drive lever 204a is pivoted counterclockwise by the open/close drive apparatus (not shown) in housing 20. Thus, actuation segment 214 of intermediate hopper 21-1 is pivoted counterclockwise and discharge gate 211 is opened almost vertically. At this time, an object to be weighed in intermediate hopper 21-1 is dropped along the inclined surface formed by the other discharge gate 212-1 and triangular bottom portion 213a of separation plate 213, and is stored in left storage chamber 23-1 of weighing hopper 22-1.

The object to be weighed which is stored in one storage chamber 23-1 is weighed by meter 24-1. During weighing, a new object to be weighed is fed to intermediate hopper 21-1 by feeer 17-1, and after a predetermined period of time has passed, drive lever 204b is driven to open discharge gate 212-1. The object to be weighed is similarly stored in right storage chamber 23-2 of weighing hopper 22-1.

In this manner, the objects to be weighed stored in storage chambers 23-1 and 23-2 are subjected to combination selection based on their weights. As a result of combination selection, if the object to be weighed in left storage chamber 23-1 is selected, drive lever 205a is pivoted counterclockwise by the open/close drive apparatus. Therefore, as shown in FIG. 9B, actuation segment 224 is pivoted, and left discharge gate 221-1 is opened almost vertically. As a result, left storage chamber 23-1 of weighing hopper 22-1 becomes a cubic shape almost the entire lower portion of which is open. As a result, the object to be weighed in storage chamber 23-1 is quickly discharged in substantially the vertical direction, and is stored in discharge hopper 26 through collecting chute 25 together with objects to be weighed which are discharged from other weighing hoppers 22-2 and 22-8. Then, the objects to be weighed are discharged at a predetermined timing to wrapping apparatus 27 and are wrapped thereby. Note that discharge gates 211, 212, and 222 opened by drive levers 204a, 204b, 205a, and 205b are closed by the biasing forces of springs 218 and 228 when the drive force of the drive levers loses.

The discharge and feed operations of the initialization mechanism for an operation zero-point correction value of the control apparatus are controlled by control apparatus 800.

The operation of control apparatus 800 will now be described with reference to the timing chart shown in FIG. 15.

Assume that objects to be weighed are stored in all intermediate hoppers 21-1 to 21-8 and all storage chambers 23-1 to 23-16 of weighing hoppers 22-1 to 22-8, and weight memories 39-1 to 39-8 and 40-1 to 40-8 respectively store corresponding weights (partial weights) (FIG. 12).

Again assume that flip-flops FF1-1 to FF1-8 and FF5-1 to FF5-8 of feed/discharge control circuits 50-1 to 50-8 are set upon power-on, other flip-flops are in the reset state, the respective timers are inoperative, and deviation measurement switches 84-1 to 84-8 of correction value setting circuits 76-1 to 76-8 are kept closed (FIGS. 13 and 14).

When the power switch of apparatus 1000 is turned on, power source timers TM7-1 to TM7-8 of correction value setting circuits 76-1 to 76-8 are operated (only TM7-1 is shown in FIG. 14), and correction value setting signals P-1 to P-8 output from first setting request units 77-1 to 77-8 are respectively input to weighing value operation circuits 31-1 to 31-8. Therefore, values obtained by respectively subtracting sum weights of weight memories 39-1 to 39-8 and 40-1 to 40-8 from weighing values from meters 24-1 to 24-8 are initially set as initial zero-point correction values in correction value memories 34-1 to 34-8.

Combination Operation

The weight storage values of weighing value operation circuits 31-1 to 31-8 are sent to combination calculator 49a of combination selection circuit 49 (FIGS. 11 and 12).

In combination calculator 49a of combination selection circuit 49 which is energized in response to the combination request signal (not shown) from wrapping apparatus 27, combined weights are calculated for all different combinations based on the weight values of the storage chambers, the combination enable signals (FIGS. 13(J) and 13(K)) of which are at "H" level.

Discriminator 49c discriminates an optimal combined weight with respect to the preset weight (final target weight) set in weight setting device 49b, and sends combination sort signals corresponding to the combination-selected storage chambers to discharge/feed control circuits 50-1 to 50-8 (FIG. 13).

Figure 15:
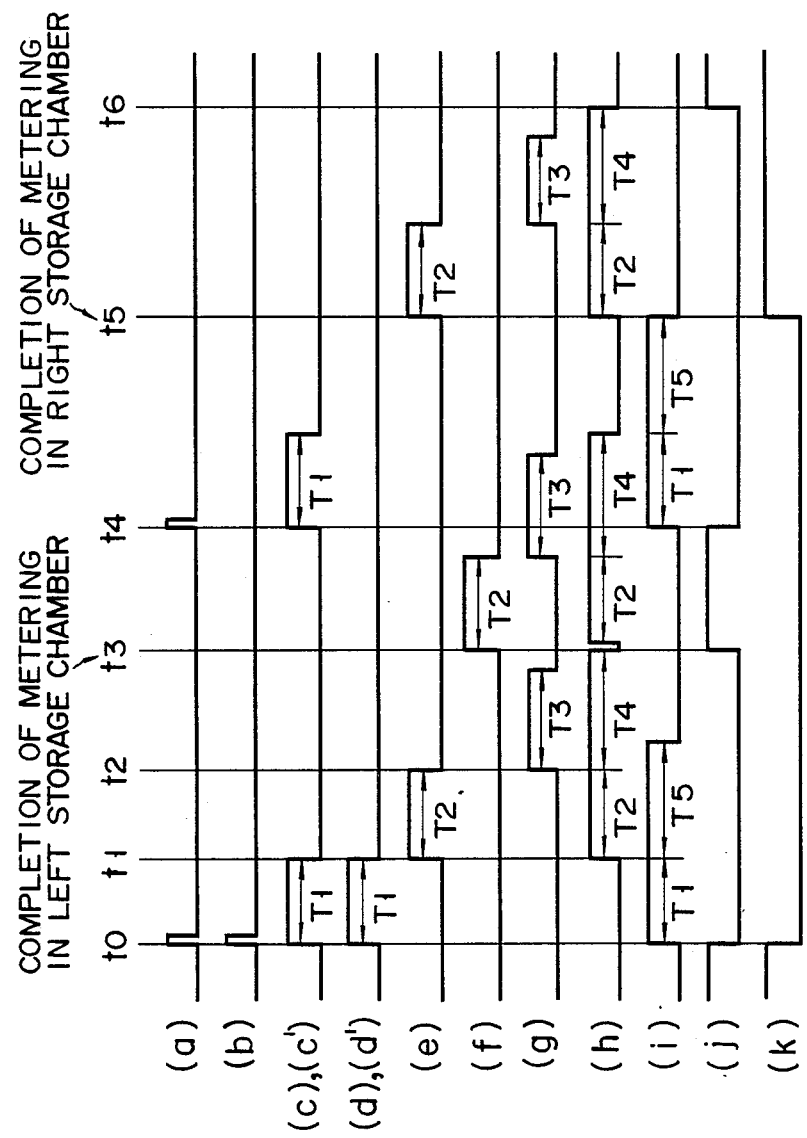
FIG. 15 is a timing chart for explaining an operation, excluding zero tracking, of the control circuit shown in FIGS. 12 and 13.

For example, if weights WLO and WRO of objects to be weighed stored in storage chambers 23-1 and 23-2 of weighing hopper 22-1 are selected at the same time, combination sort signals are respectively input to discharge timers TM1-1 and TM2-1 shown in FIG. 13 at time t0 as shown in the timing chart of FIG. 15 (FIGS. 15(a) and 15(b)).

Discharge/Feed Operation

When the combination sort signals are input, discharge timers TM1-1 and TM2-1 are operated, and their outputs go to "H" level for time interval T1 from time t0, as shown in FIGS. 15(c) and 15(d). These outputs are sent to the open/close drive apparatus in housing 20 as discharge signals D-1 and D-2, and drive levers 205a and 205b are pivoted.

Discharge gates 221 and 222 of weighing hopper 22-1 are opened for time interval T1, and the objects to be weighed stored in storage chambers 23-1 and 23-2 are discharged. The discharged objects are stored in discharge hopper 26 through collecting chute 25 together with objects to be weighed discharged from other weighing hoppers, and are discharged to wrapping apparatus 27 at a predetermined timing.

Since the outputs from discharge timers TM1-1 and TM2-1 go to "H" level at time t0, discharge stabilization timer TM6-1 is operated, and its output goes to "H" level for time interval T1 +T5 (FIG. 15(i)), and first and second weight memories 39-1 and 40-1 of weighing value operation circuit 31-1 are reset.

Upon input of the combination sort signals, outputs Q from flip-flops FF1-1 and FF5-1 go to "L" level at time t0 (FIGS. 14(j) and 14(k)), and inverted outputs Q go to "H" level. At time t1 after time interval T1 has passed from time t0, the output from discharge timer TM1-1 goes to "L" level. Therefore, drive levers 205a and 205b which open discharge gates 221 and 222 of weighing hopper 22-1 are returned to their original states, and hence, discharge gates 221 and 222 are closed.

At this time (time t1), the output from AND gate 51-1 goes to "H" level, and AND gate 53-1 outputs a positive pulse to the set terminal of flip-flop FF2-1 and OR gate 54-1.

Although the output from AND gate 68-1 similarly goes to "H" level, the output from AND gate 70-1 is left at "L" level by inverter 71-1.

Output Q from flip-flop FF2-1 set by AND gate 53-1 goes to "H" level, and is input to AND gate 55-1. Since the positive pulse from AND gate 53-1 sets flip-flop FF3-1 through OR gate 54-1 and AND gate 58-1, its inverted output Q renders intermediate timer TM3-1 operative through NOR gate 61-1. Since intermediate timer TM3-1 outputs an "H" level signal for time interval T2 from this time, the output from AND gate 55-1 goes to "H" level for time interval T2 in synchronism therewith (FIG. 15(e)). At this time, since flip-flop FF6-1 is not yet set, the output from AND gate 72-1 is kept at "L" level (FIG. 15(f)).

Weighing Operation in Left Storage Chamber

When the output from AND gate 55-1 goes to "H" level, drive lever 204a is driven by the open/close drive apparatus in housing 20, and left discharge gate 211-1 of intermediate hopper 21-1 is opened. Thus, the object to be weighed is stored in left storage chamber 23-1 of weighing hopper 22-1, and weighing by meter 24-1 is started.

When the output from intermediate timer TM3-1 goes to "H" level at time t1, drop stabilization timer TM5-1 is operated, and its output goes to "H" level for time interval T2+T4 (FIG. 15(h)).

When the output from intermediate timer TM3-1 goes to "L" level at time t2 after the lapse of time interval T2, feeder drive timer TM4-1 is operated through inverter 61-1, and its output goes to "H" level for time interval T3 from time t2 (FIG. 15(g)). The "H"-level output is amplified by current amplifier 62-1 to drive feeder 17-1, so that a new object to be weighed is fed from feeder 17-1 to intermediate hopper 21-1.

Since the output from drop stabilization timer TM5-1 goes to "L" level at time t3 after the lapse of time interval T2+T4 from time t2, the clock input of flip-flop FF4-1 goes to "H" level, and "H"-level output Q is set. Output Q sets flip-flop FF1-1 through AND gate 56-1, and resets flip-flops FF2-1 and FF4-1.

Therefore, output Q from flip-flop FF1-1 goes to "H" level (FIG. 15(j)), and is sent to combination selection circuit 49 as a combination enable signal.

At this time (time t3), the positive pulse from AND gate 46-1 is sent to weighing value operation circuit 31-1 as measurement end signal A-1, thereby turning on switch 37-1.

Weighing value (sufficiently stabilized weighing value) WT1 from meter 24-1 is input to subtractor 32-1 of weighing value operation circuit 31-1, and initial zero-point correction value WH0 is subtracted therefrom. Furthermore, in subtractor 36-1, a sum of the storage values of weight memories 39-1 and 40-1 (in this case, "0") is subtracted from the resultant difference, and the subtraction result (WT1−WH0=WL1) is stored in first weight memory 39-1.

Since measurement end signal A-1 is input, counter 42-1 is reset.

With the above operation, the weighing operation of the object to be weighed fed to left storage chamber 23-1 is completed, and weight WL1 is sent to combination measurement circuit 49.

Weighing Operation in Right Storage Chamber (Combination Priority Operation)

At time t3 corresponding to completion of weighing in left storage chamber 23-1, since inverted output Q from flip-flop FF1-1 goes to "L" level, the output from AND gate 51-1 also goes to "L" level. The output is input to AND gate 70-1 through inverter 71-1. Since the other input of AND gate 70-1 is kept at "H" level, the output from AND gate 70-1 goes to "H" level, and flip-flop FF6-1 is reset.

When flip-flop FF6-1 is set, in the same manner as in the left storage chamber, flip-flop FF3-1 is set through OR gate 54-1, intermediate timer TM3-1 is operated, and the output from AND gate 72-1 goes to "H" level for time interval T2 from time t3 (FIG. 15(f)).

This output is sent to the open/close drive apparatus in housing 20, and drive lever 204b is pivoted. Thus, right discharge gate 212 of intermediate hopper 22-1 is opened, the object to be weighed is stored in right storage chamber 23-2, and weighing by meter 24-1 is started.

When the output from intermediate timer TM3-1 goes back to "L" level after the lapse of time interval T2 from time t3, feeder drive timer TM4-1 is operated, so that the object to be weighed is fed to intermediate hopper 21-1 by feeder 17-1 (FIG. 15(g)).

When the output from intermediate timer TM3-1 goes to "H" level at time t3, drop stabilization timer TM5-1 is again operated, and its output goes to "H" level for time interval (T2+T4) from time t3 (i.e., until the sufficiently stabilized weighing value can be obtained from weighing value 24-1) (FIG. 15(h))

When weight WL1 of the object to be weighed stored in left storage chamber 23-1 is selected for combination by combination selection circuit 49 which is energized by the combination request signal (not shown) from wrapping apparatus 27 at time t4 during weighing, the combination sort signal is input to discharge timer TM1-1 (FIG. 15(a)).

When the sort signal is input, in the same manner as described above, discharge timer TM1-1 is operated (FIG. 15(c)), discharge gate212 of left storage chamber 23-1 of weighing hopper 22-1 is opened for time interval T1, and weight memory 39-1 of weighing value operation circuit 31-1 is reset. Since the output from discharge timer TM1-1 is at "H" level, discharge stabilization timer TM6-1 is operated from time t4, and its output is kept at "H" level for time interval (T1+T5). Therefore, the clock input of flip-flop FF4-1 does not rise until the output from discharge timer TM6-1 goes back to "L" level. Therefore, the combination operation is performed prior to the weighing operation.

Since the clock input of flip-flop FF4-1 goes to "H" level at time t5 after the lapse of time interval (T1+T5) from time t4, its output Q goes to "H" level, and is sent to combination selection circuit 49 as the combination enable signal (FIG. 14(k)). At this time, since flip-flop FF6-1 is set, flip-flop FF5-1 is set through AND gate 73-1, and flip-flops FF6-1 and FF4-1 are reset.

The output from AND gate 73-1 turns on switch 38-1 of weighing value operation circuit 31-1 as measurement end signal B-1.

Zero-point correction value WH0 is subtracted from sufficiently stabilized weighing value WT2 obtained from meter 24-1, and a sum of storage values of weight memories 39-1 and 40-1 (in this case "0") is also subtracted therefrom. Therefore, the resultant value is stored in weight memory 40-1 as weight WR1 of the object to be weighed stored in right storage chamber 23-2.

Next Weighing Operation Cycle

Since flip-flop FF6-1 is reset at time t5, the output from AND gate 53-1 again goes to "H" level, and flip-flop FF2-1 is set. Therefore, in the same manner as in the operation from time t1, intermediate timer T2 is operated for time interval T2 from time t5 (FIG. 15(e)), left discharge gate 211 of intermediate hopper 21-1 is opened, and the object to be weighed is stored in left storage chamber 23-1 of weighing hopper 2-1. Therefore, the objects are stored in both storage chambers 23-1 and 23-2.

At this time, drop stabilization timer TM5-1 goes to "H" level for time interval (T2+T4) (FIG. 15(h)).

Feed drive timer TM4-1 is operated for time interval T3 after the lapse of time interval T2 from time t5, and the object to be weighed is fed from feeder 7-1 to intermediate hopper 21-1.

Since the output from drop stabilization timer TM5-1 goes to "L" level at time t6 after the lapse of time interval (T2+T4) from time t5, flip-flop FF1-1 is set. Therefore, zero-point correction value WH0 is subtracted from stabilized weighing value WT3 from meter 24-1 at this time, and the sum of storage values of weight memories 39-1 and 40-1 (in this case, only storage value WR1 in weight memory 40-1) is also subtracted therefrom. As a result, WL2 (=WT3−WH0WR1) is stored in weight memory 39-1 as the weight of the object to be weighed in left storage chamber 23-1. At this time (time t6), the combination enable signal is output to combination selection circuit 49 (FIG. 15(j)), and the state as at time t0 is established. Thereafter, the same operation as described above is repeated.

The same weighing operation is performed for other weighing hoppers 21-2 to 21-8.

Zero Tracking Operation

During the weighing operation as described above, when a temperature difference, an elapsed time, or the number of discharge times from the initialization of the zero-point correction value exceeds the corresponding reference value (0.5° C., 6 minutes, or 10 times), output Q from flip-flop FF7-1 goes to "H" level.

In this state, when both combination sort signals (a) and (b) are input as shown in the timing chart shown in FIG. 16A, the objects to be weighed in storage chambers 23-1 and 23-2 are discharged at the same time (c), (d), and both feed delay timers TM8-1 and TM9-1 are operated (c'), (d'). Therefore, the feed operation of the object to be weighed from intermediate hopper 21-1 is delayed (e), and correction value setting signal P-1 is sent to weighing value operation circuit 31-1 immediately after the completion of this timer operation. Then, a stabilized weighing value of empty weighing hopper 22-1 is reset as zero-point correction value WH1 in correction value memory 34-1 through switch 45-1 (in this case, the storage values of weight memories 39-1 and 40-1 are both "0").

In the state wherein the temperature difference, the elapsed time, or the number of discharge times from the setting of the immediately preceding zero-point correction value exceeds the corresponding reference value, each time the objects to be weighed in both storage chambers 23-1 and 23-2 are discharged at the same time, a new zero-point correction value is set.

The zero tracking operation is similarly performed in other meters 24-2 to 24-8.

During the weighing operation, each time a predetermined period of time (6 minutes) has passed while no weighed object stored in a specific hopper (e.g., 24-1) is subjected to combination selection, an "H"-level pulse is output from counter 79-1 of first setting request unit 77-1. Therefore, correction value setting signal P-1 (FIG. 14) is sent to weighing value operation circuit 31-1, and the setting operation of the zero-point correction value is performed every predetermined period of time (6 minutes).

When a predetermined period of time (6 minutes) or more has passed in a state wherein no combination request signal (not shown) from wrapping apparatus 27 is input to combination selection circuit 49 due to a trouble or maintenance of, e.g., wrapping apparatus 27 (i.e., all the combination sort signals are not generated), the resetting operation of the zero-point correction value is performed for all meters 24-1 to 24-8 for every predetermined period of time.

Summary of Zero Tracking System

Figure 17:
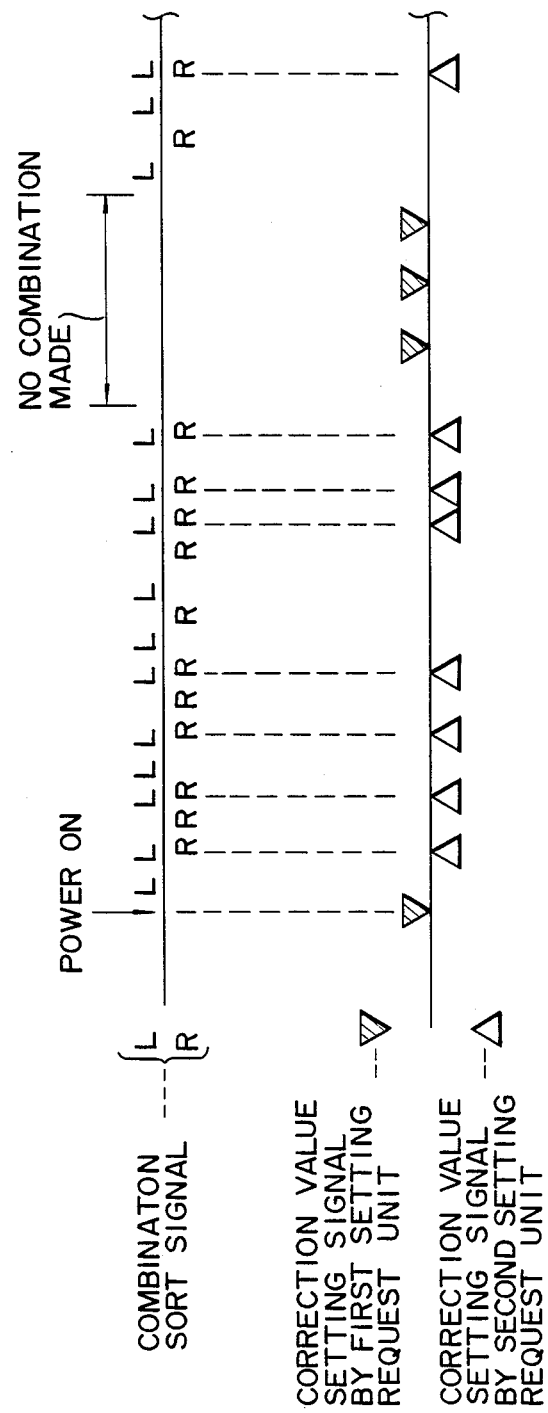
FIG. 17 is a timing chart showing an operation per line of meters by zero tracking control means 700 shown in FIG. 14.

The correction value setting operation for single meter 24-1 is summarized in FIG. 17.

FIG. 17 shows the zero tracking operation with respect to combination sort signals LR.

Immediately after power-on of apparatus 1000, the zero-point correction value is initialized by first setting request unit 77-1. More specifically, during an initial operation in which a temperature drift corresponding to the zero tracking function No. 1 is significant, the correction value setting operation by second setting request unit 83-1 is frequently performed. More specifically, this corresponds to zero tracking function No. 2.

When combination sort signals L and R are not input over a long period of time, the zero-point correction value setting operation (i.e., corresponding to zero tracking function No. 1) is performed for every predetermined period of time (6 minutes) by first setting request unit 77-1. When weighing combination sort signals L and R are input again, the resetting operation by second setting request unit 83-1 is performed (i.e., corresponding to zero tracking function No. 21). Thereafter, the resetting operation of the zero-point correction value corresponding to the operating state of the weighing apparatus is similarly performed.

Second Operation Mode of Combination Weighing Apparatus

The second operation mode (i.e., deviation measurement mode) of combination weighing apparatus 1000 of the present invention will now be described in detail.

Deviation Measurement Operation

The weighing operation by deviation measurement will be described below.

When an object to be weighed has sticking property like pickles, the power source of apparatus 1000 is turned on, and deviation measurement switches 82-1 to 82-8 of correction value setting circuits 76-1 to 76-8 are opened. At this time, correction value setting signals P1 and P-8 and deviation measurement signals Y-1 to Y-8 are input to weighing value operation circuits 31-1 to 31-8. For this reason, weighing values from meters 24-1 to 24-8 are respectively stored in correction value memories 34-1 to 34-8 through switches 47-1 to 47-8 (FIG. 12). In this state, as shown in FIG. 16B, if combination sort signal (a) (corresponding to (a) in FIG. 13) corresponding to left storage chamber 23-1 of meter 24-1 is input in this state, discharge timer TM1-1 is operated (c), and feed delay timer TM8-1 of correction value setting circuit 76-1 is operated (c'). Therefore, when about time interval T5 passes after the object to be weighed has been discharged from left storage chamber 23-1, the output from timer TM8-1 goes to low level. Therefore, intermediate hopper 21-1 is opened after time interval T5 (e) (corresponding to (e) in FIG. 13).

At this time, since switch 47-1 of weighing value operation circuit 31-1 is turned on in response to correction value setting signal P-1, stabilized weighing value W1 (a total value of an empty weighing hopper weight and a weight of an object to be weighed stored in right storage chamber 23-2) of weighing hopper 22-1 from which the object to be weighed is discharged by the combination sort signal is stored in correction value memory 34-1.

A new object to be weighed is stored in left storage chamber 23-1 from intermediate hopper 21-1, and the weighing operation is similarly started. When the weighing signal is stabilized and measurement end signal A-1 is input, a difference obtained by subtracting storage value W1 of correction value memory 34-1 from weighing value W2 is stored in weight memory 39-1 through switch 37-1 as the weight of the object to be weighed stored in left storage chamber 23-1 ($W2-W1=WL1$).

Similarly, a partial weight is calculated by subtraction between the weighing value after discharging and the weighing value after storage, and the combination selection operation is performed.

In this deviation measurement, when the object to be weighed left in the weighing hopper is discharged, the weighing error due to the residue does not occur.

Note that the above deviation measurement operation is similarly performed for other meters 24-2 to 24-8.

Third Operation Mode of Combination Weighing Apparatus

An example for more efficiently performing the zero tracking operation in the first operation mode of the above combination weighing apparatus will be explained below.

More specifically, in the embodiment of the first operation mode, after objects to be weighed stored in a pair of storage chambers are selected for combination and are discharged at the same time, the resetting operation of the zero-point correction value (i.e., zero tracking) is performed. In order to improve the setting efficiency, a total weight of objects to be weighed stored in two storage chambers can enter combination selection instead of the weights of objects to be weighed stored in the two storage chambers or can be forcibly combined and discharged.

Figure 19:
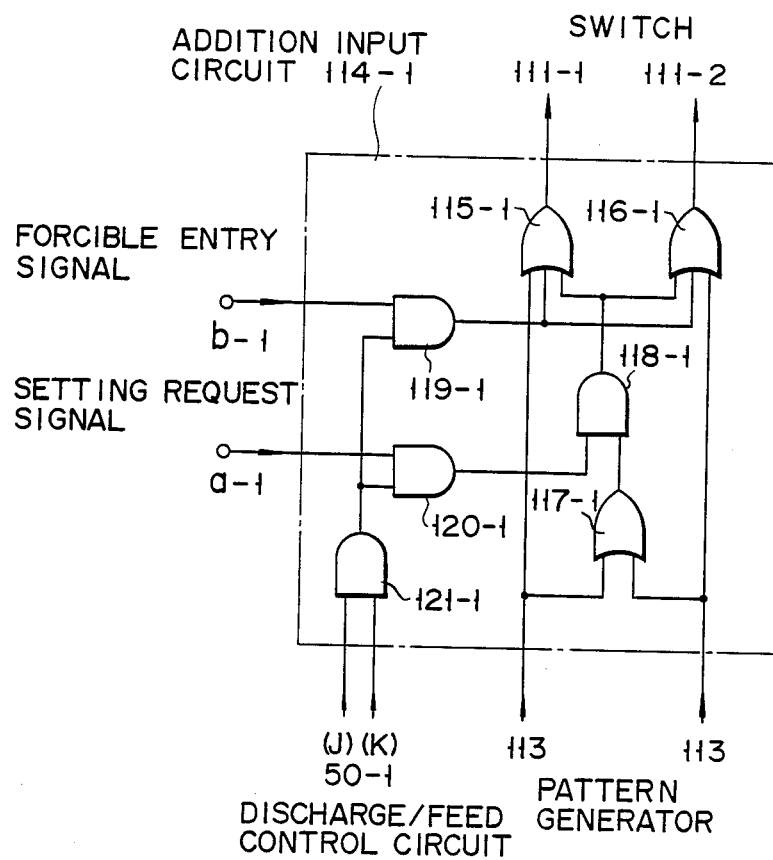

FIGS. 18 and 19 show an example of a combination calculator which is designed to achieve the above object.

Combination calculator 110 is constituted by combination adder 112 for adding weight values input from first and second weight memories 39-1 to 39-8 and 40-1 to 40-8 of weighing value operation circuits 31-1 to 31-8 shown in FIG. 12 through switches 111-1 to 111-16, and pattern generator 113 for generating different 16-bit patterns in correspondence with switches 111-1 to 111-16. In addition, as partially shown in FIG. 19, eight sets of addition input circuit 114-1 are arranged in correspondence with switches 111-1 to 111-16. Circuit 114-1 comprises OR gates 115-1, 116-1, and 117-1, and AND gates 118-1, 119-1, and 120-1. When zero-point correction value setting request signal a-1 is at "L" level while combination enable signals (j) and (k) are input from discharge/feed control circuit 50-1, circuit 114-1 controls switches 111-1 and 111-2 in accordance with the pattern outputs from pattern generator 113. When setting request signal a-1 is at "H" level, if at least one of the pattern outputs is at "H" level, circuit 114-1 turns on both corresponding switches 111-1 and 111-2.

Therefore, if setting request signal a-1 is input to addition input circuit 114-1, a total weight of weighed objects stored in both storage chambers 23-1 and 23-2 of weighing hopper 22-1 enters the combination selection. When the objects to be weighed in weighing hopper 22-1 are discharged the next time, the objects stored in both storage chambers 23-1 and 23-2 are discharged at the same time, and the resetting operation of the zero-point correction value can be efficiently performed.

When forcible entry signal b-1 is set at "H" level, weighed objects stored in storage chambers 23-1 and 23-2 of weighing hopper 22-1 are selected and combined, and are discharged for the next combination selection operation. For this reason, the resetting operation of the zero-point correction value can be more efficiently performed.

Note that if the output signals from flip-flops FF7-1 to FF7-8 of second setting request units 83-1 to 83-8 shown in FIG. 14 are used as setting request signals a-1 to a-8 and forcible entry signals b-1 to b-8, each time the temperature difference, the elapsed time, or the number of discharge times exceeds the reference value, the above-mentioned operation can be automatically performed.

Also, setting request signals a-1 to a-8 and forcible entry signals b-1 to b-8 can be manually input so as to continuously perform the zero-tracking operation for only a specific meter.

Fourth Operation Mode of Combination Weighing Apparatus

The fourth operation mode of combination weighing apparatus 1000 of the present invention will now be described with reference to FIGS. 20 and 21.

Figure 20:
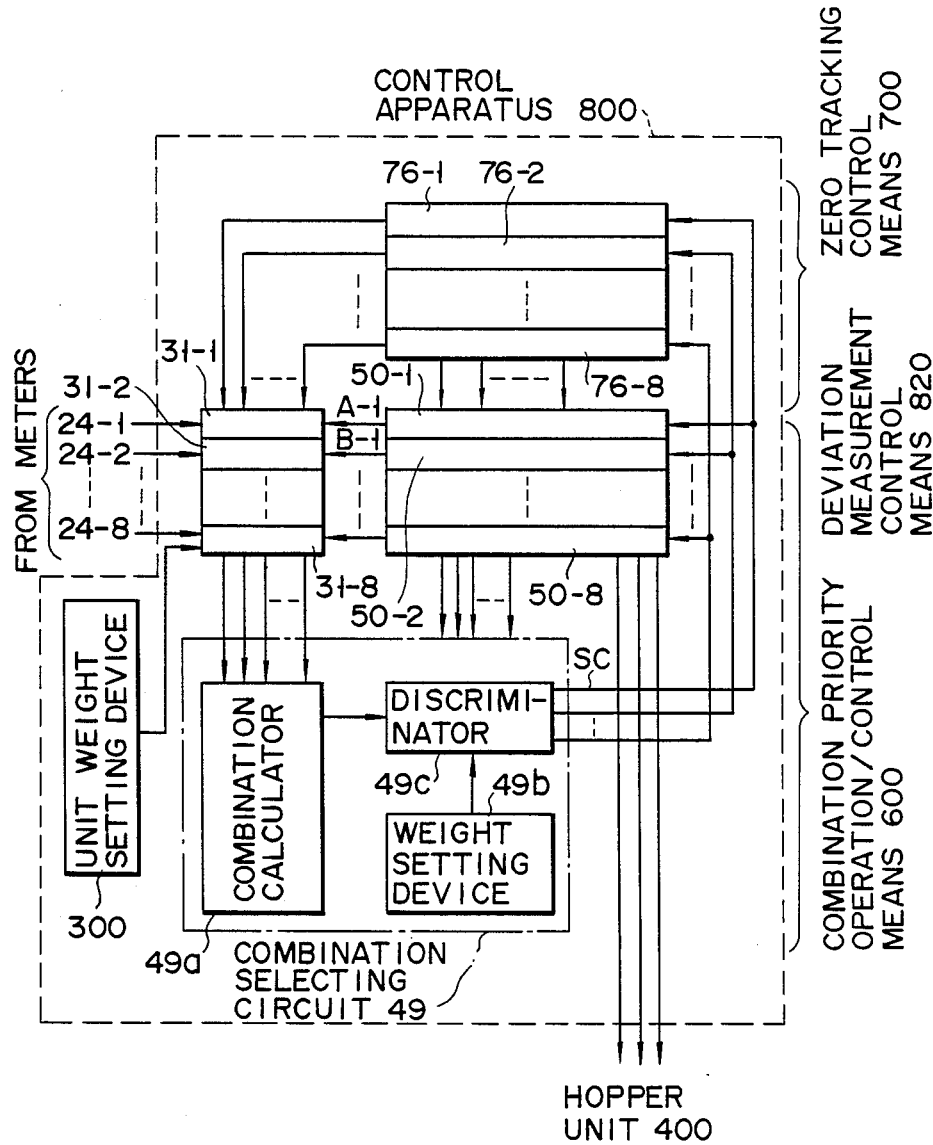
FIGS. 20 and 21 are block diagrams showing an arrangement capable of combination calculation based on the number of objects to be weighed, according to a fourth embodiment of the present invention.
Figure 21:
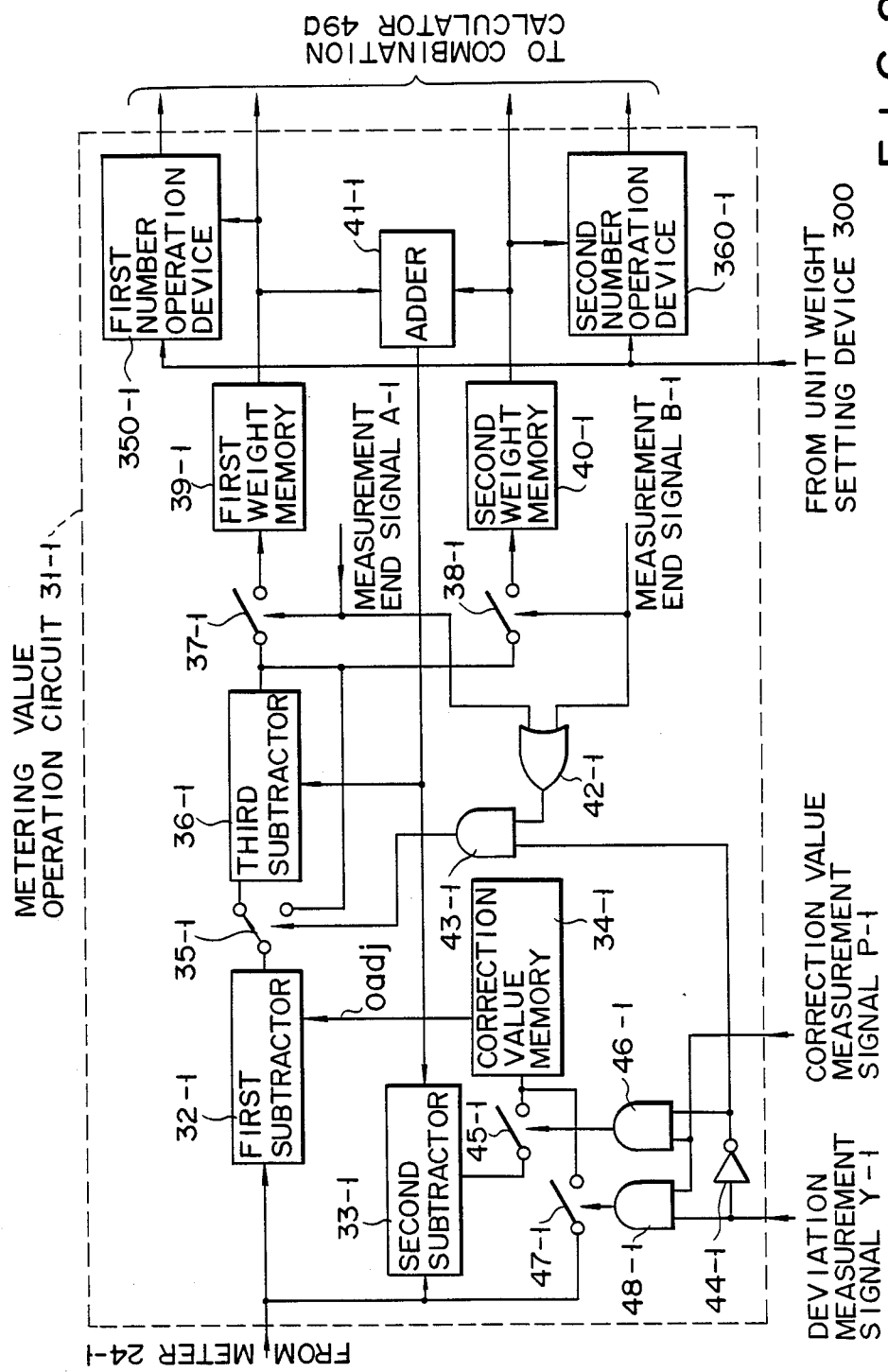

As can be seen from FIGS. 20 and 21, this operation mode is characterized by additionally providing a circuit for obtaining the number of objects to be weighed and a unit weight.

In other words, in the above three embodiments, the weights of objects to be weighed stored in storage chambers are combined to select an optimal combination with respect to a preset weight. In this embodiment, however, partial weights of objects to be weighed are divided by a unit weight, and the resultant numbers of objects are combined to select a combination with respect to a preset number.

In order to carry out the fourth operation mode, unit weight setting device 300 is connected to weighing value operation ciruits 31-1 to 31-8. As shown in FIG. 21, the output lines of first and second weight memories 39-1 and 40-1 in weighing value operation circuit 31-1 are respectively connected to first and second number operation devices (dividers) 350-1 and 360-1.

A unit weight setting signal from unit weight setting device 300 is supplied to number operation devices 350-1 and 360-1.

Not only combination using the number of objects, but also combination calculation of partial weights of objects by combination selection circuit 49 can be utilized, so that a combination of a number of objects closest to a preset number can be selected from combinations close to a final target weight. Contrary to this, combination calculation by means of the number of objects can be performed so that a combination closest to the final target weight can be selected from combinations each of number of objects close to a preset number.

Fifth Operation Mode of Combination Weighing Apparatus

The fifth operation mode of combination weighing apparatus 1000 of the present invention will now be described with reference to FIG. 22.

Figure 22:
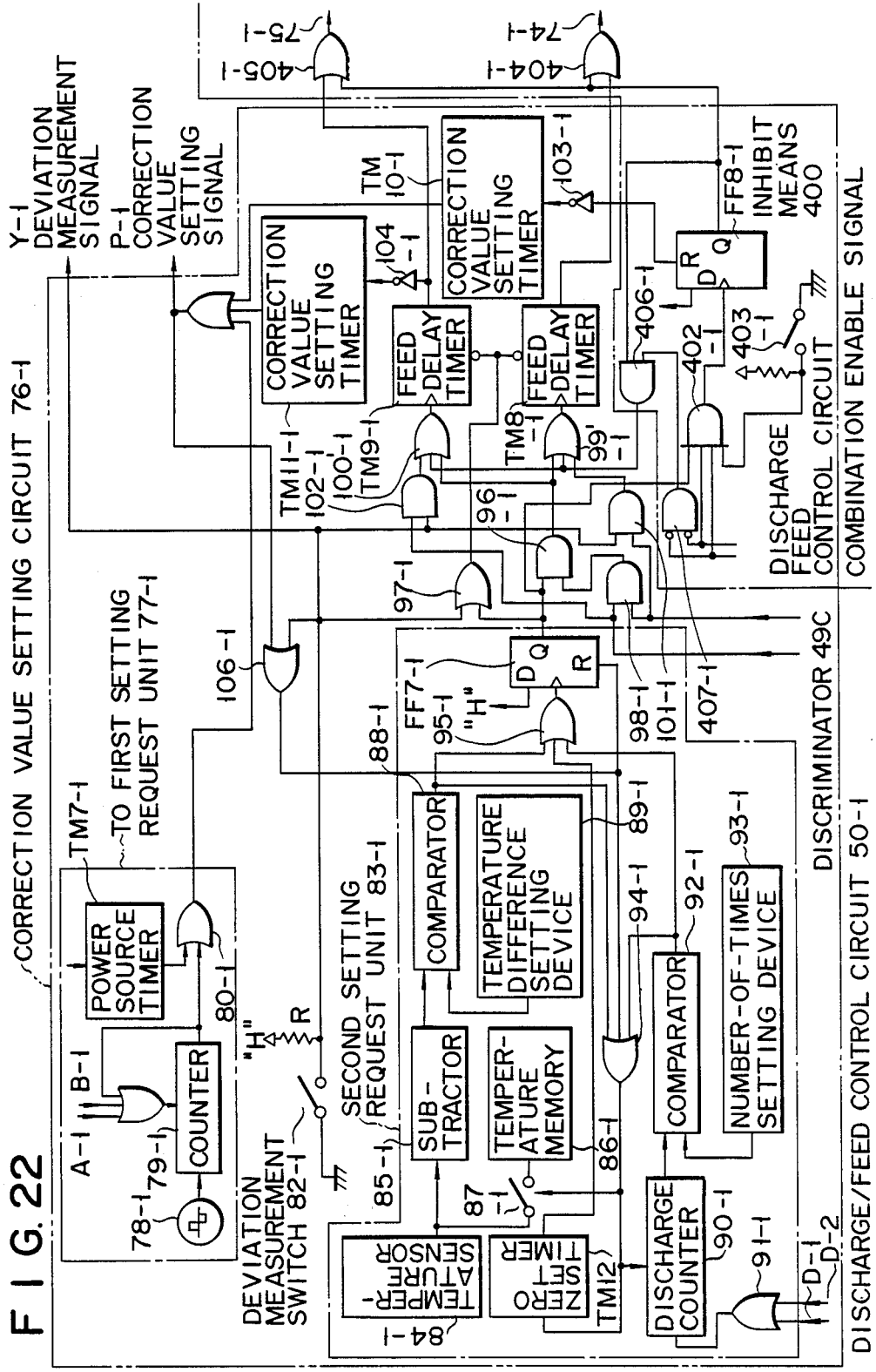
FIG. 22 is a block diagram showing an arrangement for temporarily inhibiting discharge of an object to be weighed from an intermediate hopper, according to a fifth embodiment of the present invention.

Referring to FIG. 22, as the characteristic feature of this embodiment, means 400 for temporarily inhibiting feeding of an object to be weighed from an intermediate hopper to a weighing hopper until the zero tracking operation is completed is provided to correction value setting circuit 76-1. In inhibit means 1100, a Q output of flip-flop FF7-1 for generating a zero set request flag is supplied to the first input terminal of AND gate 402-1, and the second input terminal thereof is grounded through intermediate hopper stop switch 403-1. The third and fourth input terminals of the AND gate are connected to combination enable signals (j) and (k) from discharge/feed control circuit 50-1. The output from AND gate 402-1 is connected to the clock terminal of D-type flip-flop FF8-1, and output Q of flip-flop FF8-1 is supplied to one input terminal of each of OR gates 404-1 and 405-1. The other input terminal of each of OR gates 404-1 and 405-1 respectively receives the timer outputs from feed delay timers TM8-1 and TM9-1. The output from one feed delay timer TM8-1 is connected to the reset terminal of flip-flop FF8-1. Output Q of flip-flop FF8-1 is connected to one input terminal of AND gate 406-1. The output from NOR gate 407-1 which receives combination enable signals (j) and (k) is supplied to the other input terminal of AND gate 406-1. The output from AND gate 406-1 is input to OR gates 99'-1 and 100'-1.

With the above circuit arrangement, when various zero tracking operations are executed, the feed operation of the object to be weighed to the weighing hopper can be temporarily interrupted until these zero tracking operations are completed.

For example, assume that weighed objects are stored in both storage chambers 23-1 and 23-2 of weighing hopper 22-1, and the output from flip-flop FF7-1 is at "H" level. In this state, if intermediate hopper stop switch 403-1 is opened, the output from flip-flop FF8-1 goes to "H" level, and the open/close operation of intermediate hopper 21-1 is stopped. In this state, when the objects to be weighed in both storage chambers 23-1 and 23-2 are sequentially or simultaneously discharged, since combination enable signals (j) and (k) go to "L" level, feed delay timers TM8-1 and TM9-1 are operated through AND gate 406-1 and OR gates 99'-1 and 100'-1. After feed delay timers TM8-1 and TM9-1 are operated, correction value setting signal P-1 is output, and the resetting operation of the zero-point correction value is performed.

In the method wherein the feed operation from the intermediate hopper is stopped and the zero tracking is performed as described above, the weighing hopper becomes empty after a maximum of two discharge operations since the intermediate hopper is stopped. Therefore, if the output from flip-flop FF7-1 is continuously fixed at "H" level and intermediate hopper stop switch 403-1 is opened, the zero tracking operation can be frequently performed.

More specifically, the method wherein the intermediate hopper is stopped and the zero tracking is performed can be an effective means for frequently performing zero tracking without decreasing the number of objects to be combined for combination selection at the beginning of the operation during which a temperature changes abruptly.

In the above embodiments, correction value setting circuits 76-1 to 76-8 and first setting request units 77-1 to 77-8 perform zero tracking when no discharge/feed operation of an object to be weighed is performed for a predetermined period of time. As partially shown in FIG. 23, first setting request unit 450-1 can be arranged so that the zero-point correction value is reset depending on a temperature deviation by commonly using temperature sensor 84-1 of second setting request unit 83-1. More specifically, a temperature detected by temperature sensor 84-1 during the immediately preceding discharge operation is stored in temperature memory 452-1 through switch 451-1, and a temperature deviation thereafter (output from subtractor 453-1) is compared with a reference temperature (e.g., 0.5° C.) stored in temperature difference setting device 454-1 by comparator 455-1. The comparison output is input to OR gate 80'-1.

When the first setting request unit is arranged as described above, if no discharge/feed operation of object to be weighed is performed until the temperature deviation reaches the reference value, the resetting operation of the zero-point correction value is performed.

The control apparatuses in the above embodiments can comprise a microcomputer having an equivalent operation program within the scope of the present invention.

Effect of Invention

The combination weighing apparatus of the present invention has been exemplified using the embodiments of the various modes. The effect of the apparatus of the present invention can be summarized as follows. Even while an object to be weighed stored in any of a plurality of storage chambers of a weighing hopper is subjected to weighing, a weighed object stored in the other storage chamber can be combined and selected with a weighed object stored in other weighing hoppers, and can be discharged therewith. Therefore, combination precision can be improved without decreasing the total of objects to be combined utilized for combination selection.

The resetting operation of the zero-point correction value (zero tracking) can be easily and frequently performed without stopping the operation of the apparatus, and work efficiency of the apparatus is not decreased.

During weighing of an object to be weighed having sticking property, a weighing error can be minimized.

The weighing hopper according to the present invention has a smaller width than that of the conventional weighing hopper, thus improving a space factor and hence facilitating attaching/detaching of the hoppers. Since an object to be weighed is collected at almost the central portion of the weighing hopper, an inertia with respect to the meter is small, and no large load is applied to the meter. During the discharge operation, since the entire lower portion of the storage chamber can be opened, dregs of an object to be weighed will not easily remain in the storage chamber. In particular, an object to be weighed having viscosity can be reliably discharged.

We claim:

1. A combination weighing apparatus, comprising:
   feeder means for feeding an object to be weighed;
   a plurality of weighing hopper means each having a plurality of storage chambers that are integrally coupled to one another;
   a plurality of weighing means associated with said plurality of weighing hopper means, for weighing a number of to-be-weighed objects that are stored in said storage chambers, each of the objects being of certain partial weight, and for outputting corresponding weighing signals; and
   control means for calculating values of the partial weights of the to-be-weighed objects, based on the weighing signals output from said weighing means;
   said control means including:
   means for combining either the calculated values of the partial weights, or numbers of the to-be-weighed objects that are obtained from the calculated values of the partial weights, and for deriving a combination of the storage chambers that contain selected objects which approximates or equals either a preset total weight or a preset total number of objects, respectively, and
   means for discharging the selected objects from those storage chambers storing the selected objects;
   feed control means for controlling said feeder means to feed new to-be-weighed objects to those storage chambers from which previous weighed objects have been discharged by said discharge means; and
   means for giving said discharging means operating priority over said weighing means, during an interval from a time when a new to-be-weighed object is stored, by said feed control means, in an empty storage chamber of said weighing hopper means, to a time when weighing is completed.

2. A combination weighing apparatus, comprising:
   feeder means for temporarily storing an object to be weighed, and for dischargig the to-be-weighed object;
   a plurality of weighing hopper means each having a plurality of storage chambers that are integrally coupled with one another;
   a plurality of weighing means associated with said plurality of weighing hopper means, for independently weighing a number of to-be-weighed objects that are stored in said storage chambers, each of the objects being of a certain partial weight, and for outputting corresponding weighing signals; and
   control means for calculating values of the partial weights of the to-be-weighed objects stored in said storage chambers, on the basis of the weighing signals from said weighing means;
   said control means including:
   correction value storage means for storing zero-point correction values corresponding to said plurality of weighing means;
   means for correctinq the values of partial weights including means for subtracting prestored zero-point correction values from the values of partial; weights that are acquired from said weighing means after the to-be-weighed objects are stored in predetermined storage chambers;
   combination selection means for selecting a combination of the storage chambers so that a total obtained by combining either the calculated values of partial weights, or numbers of to-be-weighed objects that are obtained from the values of partial weights, is approximate or equal to either a preset weight or a preset number of objects;
   discharge means for discharging the objects from the chambers selected by said combination selection means;
   feed control means for controlling said feeder means to feed new to-be-weighed objects to those storage chambers from which previously weighed objects have been discharged by said discharge means; and
   correction value setting means for resetting a weighed value acquired from a weighing means associated with a given weighing hopper means, to a new zero-point correction value, when to-be-weighed objects receivged in all the storage chambers of said given weighing hopper means are simultaneously selected by said combination selection means and discharged by said discharge means.

3. A combination weighing apparatus according to claim 2, wherein said correction value setting means has a zero set timer for detecting that a predetermined period has passed from an immediately preceding zero set operation, the weighing value acquired from said weighing means corresponding to said weighing hopper means being reset in said correction value storage means as a new zero-point correction value, in accordance with an output from said zero set timer.

4. A combination weighing apparatus according to claim 2, wherein said correction value setting means has a temperature sensor and temperature deviation detection means for detecting that a temperature deviation after the immediately preceding zero set operation has exceeded a predetermined value, the weighing value acquired from said weighing means corresponding to said weighing hopper means being reset in said correction value storage means as a new zero-point correction value, in accordance with an output from said temperature deviation detection means.

5. A combination weighing apparatus according to claim 2, wherein said correction value setting means has counter means for counting the number of discharge times of said weighing hopper means, when a predetermined number of discharge times after the immediately preceding zero set operation is counted by said counter means, the weighing value acquired from said weighing means corresponding to said weighing hopper means being reset in said correction value storage means as a new zero-point correction value.

6. A combination weighing apparatus, comprising:
feeder means for temporarily storing an object to be weighed, and for discharging the to-be-weighed object as needed ;
a plurality of weighing hopper means each having a plurality of storage chambers that are integrally coupled with one another;
a plurality of weighing means associated with said plurality of weighing hopper means, for independently weighing a number of to-be-weighed objects that are stored in said storage chambers, each of the objects being of a certain partial weight, and for outputting corresponding weighing signals; and
control means for calculating values of the partial weights of the to-be-weighed objects stored in said storage chambers, on the basis of the weighing signals from said weighing means;
said control means comprising:
correction value storage means for storing zero-point correction values corresponding to said plurality of weighing means;
means for correcting the calculated values of partial weights including means for subtracting prestored zero-point correction values from the values of partial weights that are acquired from said weighing means at a weighing timing after the to-be-weighed objects are stored in predetermined storage chambers; on
combination selection means for selecting a combination of the storage chambers so that a total obtained by combining either the calculated values of partial weights, or numbers of to-be-weighed objects that are obtained from the values of partial weights, is approximate or equal to either a preset weight or a preset number of objects;
discharge means for discharging and collecting the to-be-weighed objects from the plurality of storage chambers selected by said combination selection means;
feed control means for controlling said feeder means to feed new to-be-weighed objects to those storage chambers from which previously weighed objects have been discharged by said discharge means;
forcible combination means for causing said combination selection means forcibly to select a combination including either the total of the values of partial weights, or the total of said weight value or number of the to-be-weighed objects, respectively, in each storage chamber of a weighing hopper means corresponding to that weighing means which requires resetting of the zero-point correction valu stored in said correction value storage means, and
setting means for detecting that all the to-be-weighed objects in all the storage chambers of said weighing hopper means corresponding to the weighing means whose zero-point correction value is to be reset, are discharged by said forcible combination means, and for resetting a weighing value from said weighing means to a new zero-point correction value.

7. A combination weighing apparatus, comprising:
feeder means for temporarily storing an object to be weighed, and for discharging the to-be-weighed objects as needed;
a plurality of weighing hopper means each having a plurality of storage chambers that are integrally coupled with one another;
a plurality of weighing means associated with said plurality of weighing hopper means, for independently weighing a number of to-be-weighed objects that are stored in said storage chambers, each of the objects being of a certain partial weight, and for outputting corresponding weighing signals; and
control means for calculating values of the partial weights of the to-be-weighed objects stored in said storage weighing means, on the basis of the weighing signals from said weighing means;
said control means comprising:
correction value storage means for storing zero-point correction values corresponding to said plurality of weighing means;
means for correcting the calculated values of partial weights including means for subtracting prestored zero-point correction values from the values of partial weights that are acquired from said weighing means at a weighing timing after the to-be-weighed objects are stored in predetermined storage chambers;
combination selection means for selecting a combination of the storage chambers so that a total obtained by combining either the calculated values of partial weights, or numbers of to-be-weighed objects that are obtained from the values of partial weights, is approximate or equal to either a preset weight or a preset number of objects;
discharge means for discharging and collecting the to-be-weighed objects from the plurality of storage chambers selected by said cmbination selection means;

feed control means for controlling said feeder means to feed new to-be-weighed objects to those storage chambers from which previously weighed objects have been discharged by said discharge means; and correction value setting means for subtracting a total value of stored values of partial weights of all the storage chambers of certain weighing hopper means, wherein to-be-weighed objects are not fed and discharged for a predetermined period, from the weighing value of the weighing means corresponding to said weighing hopper means, and for causing said correction value storage means to store a corresponding subtraction result.

8. A combination weighing apparatus according to claim 7, wherein said correction value setting means has a zero set timer for detecting that a predetermined period has passed from an immediately preceding zero set operation, the weighing value acquired from said weighing means corresponding to said weighing hopper means being reset in said correction value storage means as a new zero-point correction value, in accordance with an output from said zero set timer.

9. A combination weighing apparatus according to claim 7, wherein said correction value setting means has a temperature sensor and temperature deviation detection means for detecting that a temperature deviation after the immediately preceding zero set operation has exceeded a predetermined value, the weighing value acquired from said weighing means, corresponding to said weighing hopper means being reset in said correction value storage means, as a new zero-point correction value, in accordance with an output from said temperature deviation detection means.

10. A combination weighing apparatus according to claim 7, wherein said correction value setting means has counter means for counting the number of discharge times of said weighing hopper means, when a predetermined number of discharge times after the immediately preceding zero set operation is counted by said counter means, the weighing value acquired from said weighing means corresponding to said weighing hopper means being reset in said correction value storage means as a new zero-point correction value.

11. A combination weighing apparatus, comprising:
feeder means for temporarily storing an object to be weighed, and for discharging the to-be-weighed objects as needed;
a plurality of weighing hopper means each having a plurality of storage chambers that are integrally coupled with one another;
a plurality of weighing means associated with said plurality of weighing hopper means, for independently weighing a number of to-be-weighed objects that are stored in said storage chambers, each of the objects being of a certain partial weight, and for outputting corresponding weighing signals; and
control means for calculating values of the partial weights of the to-be-weighed objects stored in said storage chambers, on the basis of the weighing signals from said weighing means;
said control means comprising:
correction value storage means for storing zero-point correction values corresponding to said plurality of weighing means;
means for correcting the calculated values of partial weights including means for subtracting prestored zero-point correction values from the values of partial weights that are acquired from said weighing means at a weighing timing after the to-be-weighed objects are stored in predetermined storage chambers;

combination selection means for selecting a combination of the storage chambers so that a total obtained by combining either the calculated values of partial weights, or numbers of to-be-weighed objects that are obtained from the values of partial weights, is approximate or equal to either a preset weight or a preset number of objects;

discharge means for discharging and collecting the to-be-weighed objects from the plurality of storage chambers selected by said combination selection means;

feed control means for controlling said feeder means to feed new to-be-weighed objects to those storage chambers from which previously weighed objects have been discharged by said discharge means; and addition input means for sending a sum of partial weight values of to-be-weighed objects, stored in all the storage chambers of certain weighing hopper means, to said combination selection means, instead of a partial weight value of a to-be-weighed object of each of said weighing hopper means associated with weighing means which requires resetting of a zero-point correction value stored in said correction value storage means; and correction value setting means for detecting that the sums of weight values from said addition input means are combined and selected by said combination selection means and the to-be-weighed objects, stored in all the storage chambers of a weighing hopper means corresponding to a weighing means whose zero-point correction value is to be reset, are discharged to said discharge means, and for causing the correction value storage means corresponding to said weighing means to store the weighing value from said weighing means as a new zero-point correction value.

12. A combination weighing apparatus, comprising:
feeder means for temporarily storing an object to be weighed, and for discharging the to-be-weighed objects;
a plurality of weighing hopper means each having a plurality of storage chambers that are integrally coupled with one another;
a plurality of weighing means associated with said plurality of weighing hopper means, for independently weighing a number of to-be-weighed objects that are stored in said storage chambers, each of the objects being of a certain partial weight, and for outputting corresponding weighing signals; and
control means for (a) calculating values of the partial weights of the to-be-weighed objects, stored in said storage chambers, on the basis of the weighing signals from said weighing means, (b) combining either the calculated values of partial weights, or numbers of to-be-weighed objects that are obtained from the partial weight values, and selecting a combination of the storage chambers that provides a value approximate or equal to either a preset weight or a preset number of objects, respectively, and (c) causing the selected objects to be discharged from said storage chambers;
said control means including:
deviation measurement control means for obtaining a deviation from a stable weighing value after storage to the to-be-weighed object, with reference to a weighing value obtained from an immediately preceding weighing means each time a to-be-weighed object is stored in any storage chamber of said weighing hopper means, and for calculating a corresponding partial weight value of said object stored in any storage chamber of said weighing hopper means, wherein the deviation calculated by said deviation measurement control means is regarded as a partial weight value of said object.

13. A combination weighing apparatus, comprising:

feeder means for temporarily storing an object to be weighed, and for discharging the to-be-weighed objects;

a plurality of weighing hopper means each having a plurality of storage chambers that are integrally coupled with one another;

a plurality of weighing means associated with said plurality of weighing hopper means, for independently weighing a number of to-be-weighed objects that are stored in said storage chambers, each of the objects being of a certain partial weight, and for outputting corresponding weighing signals; and control means for (a) calculating values of the partial weights of the to-be-weighed objects, stored in said storage chambers, on the basis of the weighing signals from said weighing means, (b) combining either the calculated partial weight values, or numbers of to-be-weighed objects that are obtained from the partial weight values, (c) selecting a combination of said storage chambers that provides a value approximate or equal to either a preset weight or a preset number of objects, respectively, and (d) causing the selected objects to be discharged from said storage chambers, wherein;

said weighing hopper means has a substantially inverted triangular section, the interior of said weighing hopper means is divided into a plurality of storage chambers each having an entire lower section with a partition plate arranged in a substantially vertical direction, and a discharge gate in each of the storage chambers for opening the entire lower portion of a corresponding storage chamber and discharging a to-be-weighed object.

14. A combination weighing apparatus according to claim 13, characterized by further comprising a plurality of intermediate hopper means for receiving the objects to be weighed, discharged from said feeder means, said intermediate hopper means being selected by said feed control means.

15. A combination weighing apparatus, comprising:

feeder means for temporarily storing an object to be weighed, and for discharging the to-be-weighed object;

a plurality of weighing hopper means each having a plurality of storage chambers that are integrally coupled with one another;

a plurality of weighing means associated with said plurality of weighing hopper means, for independently weighing a number of to-be-weighed objects that are stored in said storage chambers, each of the objects being of a certain partial weight, and for outputting corresponding weighing signals; and control means for calculating values of the partial weights of the to-be-weighed objects stored in said storage chambers, on the basis of the weighing signals from said weighing means;

said control means including:

correction value storage means for storing zero-point correction values corresponding to said plurality of weighing means;

means for correcting the values of partial weights including means for subtracting prestored zero-point correction values from the values of partial; weights that are acduired from said weighing means after the objects are stored in predetermined storage chambers;

combination selection means for selecting a combination of the storage chambers so that a total obtained by combining either the calculated values of partial weights, or numbers of to-be-weighed objects that are obtained from the values of partial weights, is approximate or equal to either a preset weight or a preset number of objects;

discharge means for discharging the objects from the plurality of storage chambers selected by said combination selection means;

feed control means for controlling said feeder means to feed new to-be-weighed objects to those storage chambers from which previously weighed objects have been discharged by said discharge means;

means for inhibiting feeding of a to-be-weighed object to the weighing hopper means associated with a weighing means that requests a zero setting; and detection means for detecting that all the storage chambers of said weighing hopper means have been emptied;

wherein said control means is operative to inhibit feeding of an object to be weighed to a corresponding weighing hopper means, until all the storage chambers of said weighing hopper means requesting a zero setting are emptied and the zero-point correction operation is completed.

* * * * *